US008154788B2

(12) United States Patent
Millett et al.

(10) Patent No.: US 8,154,788 B2
(45) Date of Patent: Apr. 10, 2012

(54) THERMOCHROMIC WINDOW STRUCTURES

(75) Inventors: Frederick A. Millett, Grand Haven, MI (US); Michael D. Broekhuis, Jr., Wyoming, MI (US); Harlan J. Byker, West Olive, MI (US); Paul H. Ogburn, Jr., Hudsonville, MI (US)

(73) Assignee: Pleotint, L.L.C., West Olive, MI (US)

( * ) Notice: Subject to any disclaimer, the term of this patent is extended or adjusted under 35 U.S.C. 154(b) by 0 days.

(21) Appl. No.: 12/906,704

(22) Filed: Oct. 18, 2010

(65) Prior Publication Data
US 2011/0075244 A1   Mar. 31, 2011

Related U.S. Application Data

(62) Division of application No. 11/849,704, filed on Sep. 4, 2007, now Pat. No. 7,817,328.

(60) Provisional application No. 60/841,827, filed on Sep. 1, 2006.

(51) Int. Cl.
*G02F 1/01* (2006.01)
*G02F 1/15* (2006.01)

(52) U.S. Cl. ........................................ 359/288; 359/265

(58) Field of Classification Search .................. 359/594, 359/609, 265–277, 288, 289, 290–291, 614; 52/1
See application file for complete search history.

(56) References Cited

U.S. PATENT DOCUMENTS

| | | | |
|---|---|---|---|
| 2,710,274 A | 6/1955 | Kuehl | |
| 3,192,101 A | 6/1965 | Koenig | |
| 3,236,651 A | 2/1966 | Marks et al. | |
| 3,445,291 A | 5/1969 | Stein | |
| 3,723,349 A | 3/1973 | Heseltine et al. | |
| 3,816,335 A | 6/1974 | Evans | |
| 4,044,519 A | 8/1977 | Morin et al. | |
| 4,575,259 A | 3/1986 | Bacci et al. | |
| 4,577,619 A | 3/1986 | Howe, Jr. | |
| 4,970,315 A | 11/1990 | Schmidhalter | |
| 5,094,055 A | 3/1992 | Berdan | |
| 5,159,057 A | 10/1992 | Perry | |
| 5,240,897 A | 8/1993 | Braun et al. | |
| 5,525,430 A | 6/1996 | Chahroudi | |
| 5,547,815 A | 8/1996 | Vanmaele | |
| 6,084,702 A | 7/2000 | Byker et al. | |
| 6,094,290 A | 7/2000 | Crawford et al. | |
| 6,103,459 A | 8/2000 | Diel | |
| 6,362,303 B1 | 3/2002 | Byker et al. | |
| 6,373,618 B1 * | 4/2002 | Agrawal et al. | 359/265 |

(Continued)

FOREIGN PATENT DOCUMENTS
EP   0356116   2/1990
(Continued)

OTHER PUBLICATIONS

JP, Office Action, Japanese Application No. 2009-526933 (Sep. 28, 2010).

(Continued)

*Primary Examiner* — Mohammed Hasan
(74) *Attorney, Agent, or Firm* — Thompson Hine LLP

(57) ABSTRACT

An energy efficient, thermochromic device that may be used to allow sunlight or solar radiation into a building or structure when sunlight is absent or at high sun angles and substantially blocks solar radiation when sunlight is directly on the window.

26 Claims, 21 Drawing Sheets

U.S. PATENT DOCUMENTS

| | | | |
|---|---|---|---|
| 6,446,402 B1 | 9/2002 | Byker et al. | |
| 6,479,293 B1 | 11/2002 | Tamura et al. | |
| 6,594,067 B2 * | 7/2003 | Poll et al. | 359/275 |
| 6,620,872 B2 | 9/2003 | Fisher | |
| 6,665,107 B2 | 12/2003 | Forgette et al. | |
| 6,737,159 B2 | 5/2004 | Garrett et al. | |
| 6,737,418 B2 | 5/2004 | Hogenkamp et al. | |
| 6,998,072 B2 | 2/2006 | Welch et al. | |
| 7,179,535 B2 | 2/2007 | Fisher | |
| 7,226,966 B2 | 6/2007 | Kambe et al. | |
| 7,256,296 B2 | 8/2007 | Diamond et al. | |
| 7,542,196 B2 * | 6/2009 | Byker et al. | 359/288 |
| 7,817,328 B2 * | 10/2010 | Millett et al. | 359/288 |
| 2006/0159874 A1 | 7/2006 | Koran et al. | |
| 2008/0100902 A1 | 5/2008 | Byker et al. | |
| 2008/0100903 A1 | 5/2008 | Byker et al. | |
| 2008/0105851 A1 | 5/2008 | Byker et al. | |
| 2008/0106781 A1 | 5/2008 | Byker et al. | |

FOREIGN PATENT DOCUMENTS

| | | |
|---|---|---|
| JP | H02-180973 | 7/1990 |
| JP | 2004-359623 | 12/2004 |
| WO | 2008/028128 | 3/2008 |

OTHER PUBLICATIONS

US, Office Action, U.S. Appl. No. 11/849,624 (Aug. 31, 2010).
US, Office Action, U.S. Appl. No. 11/849,704 (Dec. 1, 2009).
US, Notice of Allowance, U.S. Appl. No. 11/849,704 (Jun. 18, 2010).
US, Supplemental Notice of Allowance, U.S. Appl. No. 11/849,704 (Oct. 12, 2010).
Angell, C.A., "Octahedral-Tetrahedral Coordination Equilibria of Nickel (II) and Copper (II) in Concentrated Aqueous Electrolyte Solutions," *Journal of the American Chemical Society*,88 (22), pp. 5192-5198 (Nov. 20, 1966).
Arutjunjan, R. et al., "Smart Thermochromic Glazing for Energy Saving Window Applications," Poster Session Abstract 8, The Fourth International Conference on Advanced Optical Materials and Devices, Tartu, Estonia (Jul. 2006-Sep. 2004).
Arutjunjan, R.E. et al., "Thermochromic Glazing for 'Zero Net Energy' House," Glass Processing Days, Conference Proceedings, pp. 299-301, Eighth International Conference (Jun. 15-18, 2003).
Day, J.H., "Thermochromism of Inorganic Compounds," *Chemical Reviews*, vol. 68, No. 6, pp. 649-657 (Nov. 25, 1968).
EP, Communication from the European Patent Office, European Application No. 07841718.5 (Oct. 27, 2009).
Gill, Naida S. et al., "Complex Halides of the Transition Metals. Part I. Tetrahedral Nickel Complexes," *J. Chem. Soc.*, pp. 3397-4007 (1959).
Greenberg, C., "Chromogenic Materials (Thermochromic)," *Kirk-Othmer Encyclopedia of Chemical Technology 4th Edition*, vol. 6, pp. 337-343, John Wiley & Sons.
Griffiths, T.R. et al., "Effects of Cations upon Absorption Spectra Part 4.-Octahedral-Tetrahedral Equilibria between Chloro-nickel(II) Complexes in Ethylene Glycol and Glycerol," *Trans. Faraday Soc.*, 65, pp. 3179-3186 (1969).
Griffiths, T.R. et al., "Effects of Cations upon Absorption Spectra Part 2.-Formation of Tetrahedral Tetrachloronickelate(II) in Aqueous Solution," *Trans. Faraday Soc.*, 65, pp. 1727-1733 (1969).
Halopenen, I. et al., "Smart Laminated Glasses for Regulation of Lighting," Glass Processing Days, Conference Proceedings, pp. 324-326, Sixth International Conference (Jun. 13-16, 1999).
Katzin, L.I., "Energy Value of the Octahedral-Tetrahedral Coordination Change,", *The Journal of Chemical Physics*, vol. 35, No. 2, pp. 467-472 (Aug. 1961).
*Kirk-Othmer Encyclopedia of Chemical Technology Third Edition*, vol. 6, "Chromogenic Materials (Electro-, Thermo-) Electrochromic and Thermochromic," pp. 129-142, John Wiley & Sons (1979).
Kojima, K. et al., "Pressure and Temperature Effects on Octahedral-Tetrahedral Equilibria in Pyridine Solution of Some Cobalt(II) Halides. II," *Bull. Chem. Soc. Jpn.*, vol. 57, No. 3, pp. 879-880 (Mar. 1984).
Kojima, K. et al., "Pressure and Temperature Effects on Octahedral-Tetrahedral Equilibria in Pyridine Solution of Some Cobalt(II) Halides," *Bull. Chem. Soc. Jpn.*, vol. 56, No. 3, pp. 684-688 (Mar. 1983).
Kuroiwa, K. et al., "Heat-Set Gel-Like Networks of Lipophilic Co(II) Triazole Complexes in Organic Media and Their Thremochromic Structural Transitions," *Journal of the American Chemical Society*, vol. 126, pp. 2016-2021 (XP-002465697) (Apr. 2004).
Long, G.J. et al., "Transition Metal Chemistry of Quinuclidinone-Containing Ligands. III. Electronic and Structural Properties of Several Transition Metal Complexes Containing *trans*-2-(2'-Quinolyl)methylene-3-quinuclidinone," *Inorganic Chemistry*, vol. 13, No. 2, pp. 270-278 (XP-002465696) (Mar. 1974).
Marinkovic, M. et al., "Thermochromic complex compounds in phase change materials: Possible application in an agricultural greenhouse," *Solar Energy Materials and Solar Cells*, 51, pp. 401-411 (1998).
PCT, International Preliminary Report on Patentability, International Application No. PCT/US2007/077333 (Mar. 12, 2009).
PCT, International Preliminary Report on Patentability, International Application No. PCT/US2007/077385 (Mar. 12, 2009).
PCT, International Search Report, International Application No. PCT/US2007/077333 (Mar. 28, 2008).
PCT, International Search Report, International Application No. PCT/US2007/077385 (Feb. 4, 2008).
PCT, Written Opinion, International Application No. PCT/US2007/077333 (Mar. 28, 2008).
PCT, Written Opinion, International Application No. PCT/US2007/077385 (Feb. 04, 2008).
Rozova, K.B. et al., Abstract for "Sun screening thermochromic glazing materials," TsNIIEP, USSR. Svetotekhnika (1986), (10), 12-14. CODEN: SVETAG ISN: 0039-7067. Journal written in Russian. CAN 107:30324 AN 1987:430324 CAPLUS.
Scaife, D.E. et al., "Influence of Temperature on Some Octahedral-Tetrahedral Equilibria in Solution," *Inorganic Chemistry*, vol. 6, No. 2, pp. 358-365 (Feb. 1967).
Sestili, L. et al., "Formation Equilibria of Pseudotetrahedral Co(II) Halogenocomplexes in Acetonitrile," *J. Inorg. Nucl. Chem.*, No. 32, pp. 1997-2008 (1970).
Sone, K. et al., *Inorganic Thermochromism*, pp. 1-71, Springer-Verlag (1987).
Srivastava, J. et al., "Synthesis of Polyacrylic Acid Based Thermochromic Polymers," *Proc. of SPIE*, vol. 5062, pp. 111-115 (2003).
Sunamoto, J. et al., "Formation of Polynuclear Cupric Halides in Cationic Reversed Micelles," *Inorganic Chemisry*, vol. 19, No. 12, pp. 3668-3673.
Sunamoto, J. et al., "Reversed Micelles to Mimic the Active Site of Metalloenzymes," *Inorganic Chimica Acta*, 92, pp. 159-163 (1984).
Sunamoto, J. et al., "Solvochromism and Thermochromism of Cobalt(II) Complexes Solubilized in Reversed Micelles," *Bulletin of the Chemical Society of Japan*, vol. 51, No. 11, pp. 3130-3135 (Nov. 1978).
US, Notice of Allowance and Issue Fee(s) Due, U.S. Appl. No. 11/849,574 (Jan. 28, 2009).
US, Notice of Allowance and Issue Fee(s) Due, U.S. Appl. No. 11/849,642 (Dec. 16, 2008).
US, Notice of Allowance and Issue Fee(s) Due, U.S. Appl. No. 11/849,659 (Dec. 16, 2008).
US, Office Action, U.S. Appl. No. 11/849,574 (Sep. 22, 2008).
Yanush, O.V. et al., "Laminated Glass with Variable Transmission for Daylight Regulation," Glass Processing Days, Conference Proceedings, pp. 815-817, Seventh International Conference (Jun. 18-21, 2001).
US, Notice of Allowance, U.S. Appl. No. 12/474,932 (Apr. 25, 2011).
US, Office Action, U.S. Appl. No. 11/849,624 (May 27, 2011).

* cited by examiner

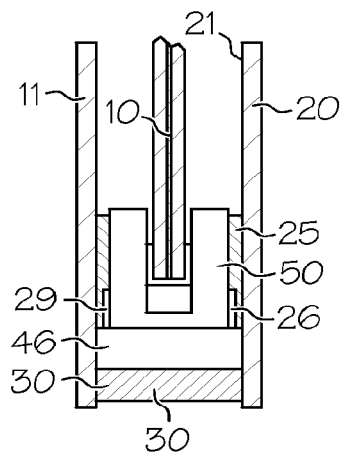
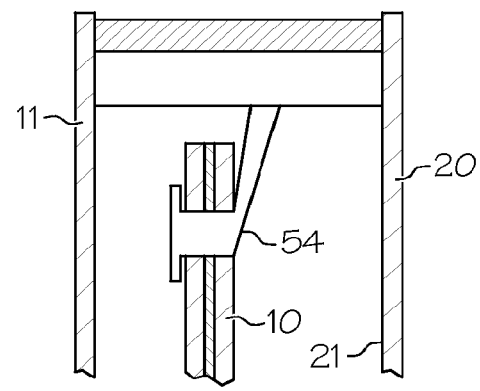
FIG. 32    FIG. 34
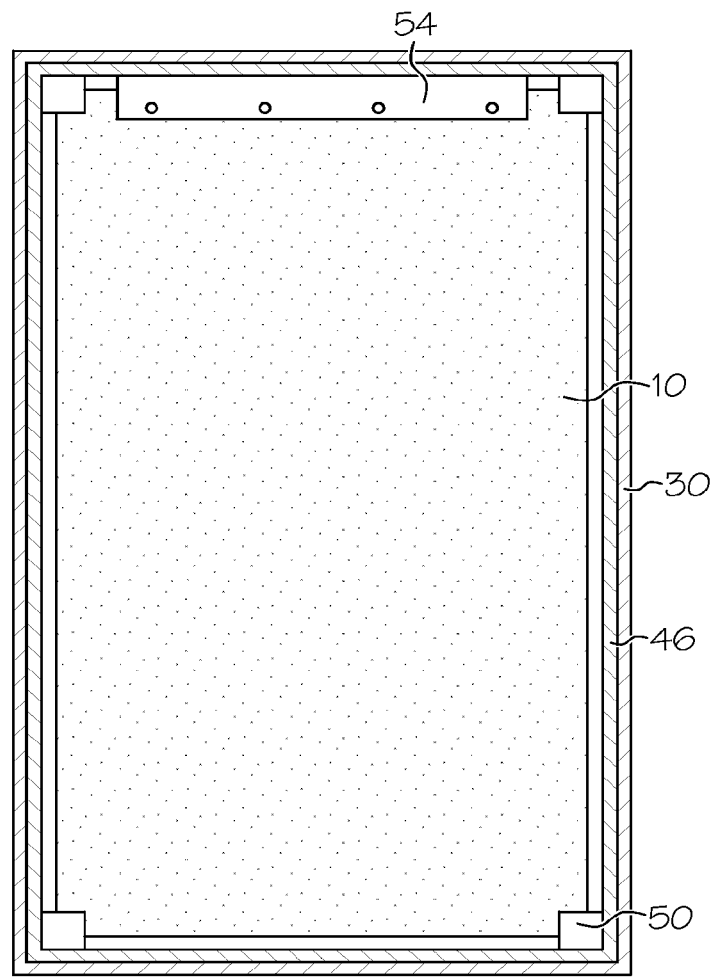
FIG. 33

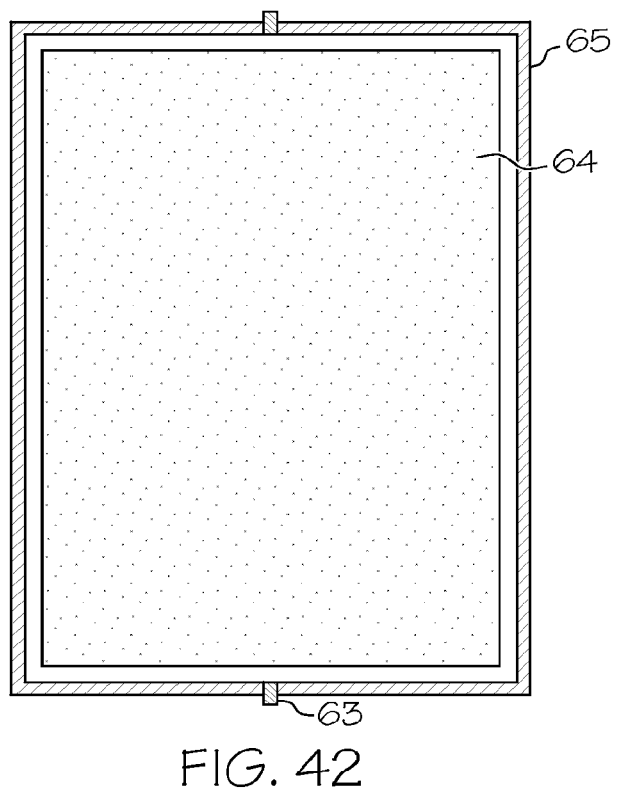
FIG. 42
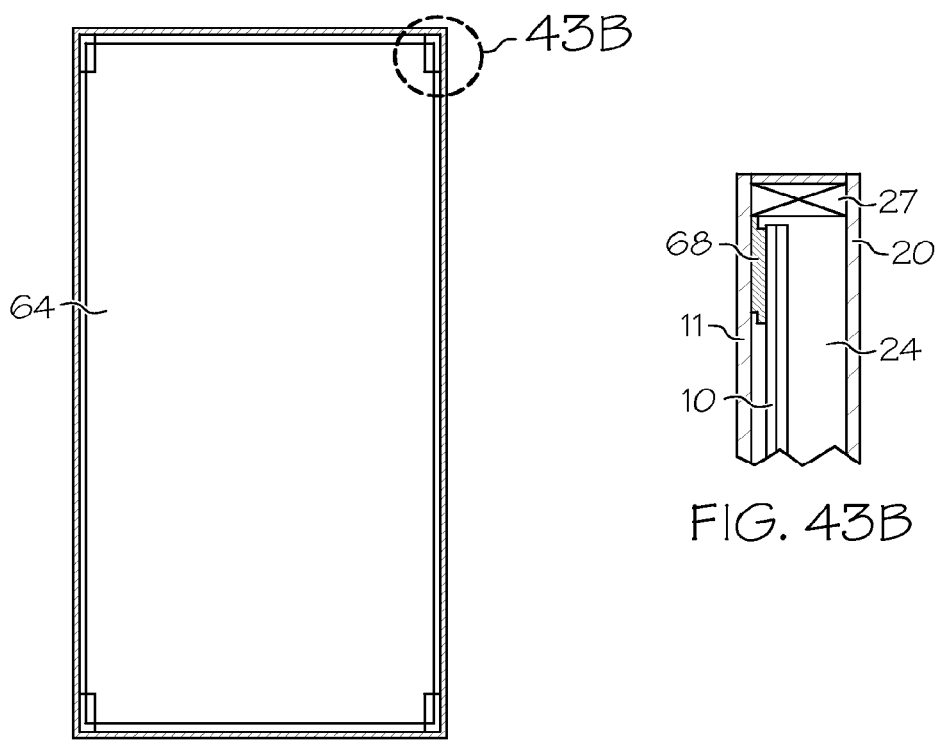
FIG. 43A
FIG. 43B

THERMOCHROMIC WINDOW STRUCTURES

CROSS REFERENCE TO RELATED APPLICATION

This application is a divisional of U.S. application Ser. No. 11/849,704 filed Sep. 4, 2007 now U.S. Pat. No. 7,817,328, which claims the benefit of U.S. Provisional Application Ser. No. 60/841,827 filed on Sep. 1, 2006, the entire contents of which are hereby incorporated by reference.

BACKGROUND

This application is directed to sunlight responsive thermochromic window systems and, more particularly, to window structures for thermochromic window systems.

A conventional window for the residential market consists of a double pane unit with a clear piece of glass on the outside and a low-E piece of glass on the inside pane with the low-E coating face outwards. A conventional high performance window for commercial applications utilizes a double pane construction with a tinted glass pane on the outside and a low-E coating either on the tinted glass or on the second pane of glass.

Sunlight responsive thermochromic (SRT) windows are variable tint windows that darken and lighten based on the amount of sunlight shining directly on the window. Exemplary examples of thermochromic windows include U.S. Pat. Nos. 6,446,402 and 6,084,702 to Byker et al., the contents of which are incorporated herein by reference.

Windows provide a significant design challenge for architects and builders. Large, high transmission windows are desirable for providing an open-air feeling to building occupants, providing significant solar heat gain when sunlight is directly on them and for allowing visible light into a building to provide daylighting and thereby substantially reduce the need for electric lighting during the time when occupants are most often present. However, conventional windows are problematic for admitting excessive amounts of solar heat when air conditioning is already in use. This is especially true at certain times of the day and certain parts of a building when the solar radiation is shining directly on or through the windows.

An attempted solution to the problem is the use of window treatments like shades, drapes and blinds. However these are expensive, cumbersome and aesthetically undesirable solutions, particularly in large office buildings, hotel atria and airport terminals. With control of sunlight by thermochromic windows, the need for conventional blinds and shades, to control heat gain and glare, is minimized, this also enhances energy savings in that artificial lighting needs will be reduced. Large window designs become acceptable when the challenge of excessive heat load can be met with the straightforward window dimming capability provided by thermochromics.

Insulated glass (IG) is referred to throughout this disclosure with the meaning of insulated glass or plastic, as interchangeable elements. IG construction assures sufficient insulation performance regardless of outside ambient temperatures or convective heat loss due to air movement over the outboard window pane.

As an absorbing window pane is heated by the sun, even in the absence of wind, thermal currents are induced and natural convection occurs. SRT window designs must account for these thermal currents as well as wind-induced thermal effects to maintain superior window performance during daylight service. Architects and building designers desire window energy savings performance, excellent sound reduction along with the capability of using a self-cleaning layer, safety performance, resistance to fire, blast, bullets and hurricanes. Glazing installers desire the ability to fit windows with traditional methods without wires, power supplies, energy management systems and controllers. SRT windows can provide substantial energy savings compared to traditional window systems.

Accordingly, there is a need for a thermochromic window system to trap the sunlight energy, and keep it from penetrating inside the building. Furthermore, the trapped heat energy may be redirected to either the inside or outside of the building by the thermochromic window system while diminishing glare from the sun.

SUMMARY

An aspect of the disclosure relates to an insulated window construction designed for a sunlight responsive thermochromic (SRT) window system. This disclosure further relates to functional enhancements as well as the plurality of uses for thermochromic materials in a window system. In one embodiment, the window system includes a first window pane, a thermochromic window pane, and a low E window pane and further includes spacers disposed between the panes thereby providing a separation gap and a substantially parallel orientation to the window panes. The separation gap may be sealed or open depending on the desired energy performance desired. Highly insulating or highly conductive gas, as well as the separation between the panes may be used to increase or decrease the insulating capability of the window system or a particular part of the window system. Also disclosed are novel constructions unique to the performance of SRT panels in an insulated glass window system with respect to its sunlight absorbing nature.

Another aspect of the disclosure relates to a window structure including a variable solar heat gain coefficient value, a low heat transfer coefficient value and a high insulation coefficient value. The spaces of an SRT insulated glass window can be constructed to maximize the heat transfer from the SRT layer to the outside and minimize the heat transfer from the SRT layer to the inside. Spacers may absorb the differential thermal expansion of the SRT panel, compared to the other layers as it warms. Furthermore, a plastic laminate may be used to take advantage of the reduced weight of plastic compared to glass.

Another aspect of the disclosure relates to a SRT panel configured as a blind and incorporated within the IG pane being operable in either a manual or electronic mode.

A further aspect of the disclosure relates to a structural foam spacer allowing the window pane to flex while maintaining the spaced apart nature of the window to relieve a portion of the built-up pressure without breaking the seal. The spacer also minimizes the heat transfer from the hot thermochromic pane to the edge of the window structure, which can cause the perimeter of the window to appear lighter than its center areas. Another aspect of the disclosure relates to a vent tube or capillary tube allowing the air space to equalize pressure as the SRT panel warms. The capillary tube allows the air pressure in the space or spaces to equalize but also restricts moisture transmission. The relieved gas pressure allows the window pane to remain parallel without bowing typically caused by imbalanced pressures.

Another aspect of the disclosure relates to a bladder adapted to expand and contract to relive gas pressure build-up as the middle SRT layer gets warm and transfers a portion of the heat to the air space separating the glass panes. The bladder accommodates expansion of a wide range of insulating gases, such as but not limited to air, argon, krypton, etc.

A further aspect of the disclosure relates to an aluminum backed tape to seal the thermochromic layer edges from moisture and gas infiltration.

Another aspect of the disclosure is the SRT's ability to absorb sunlight energy and convert this energy into heat that can be used to warm the interior or to be redirected outside. Controlling the heat of the SRT layer can also be achieved by directing air flow over the SRT layer. The ability of the SRT material to be made into a rigid plastic sheet provides the ability to make blinds that perform the absorbing function that can be manually or automatically adjusted. Plastic sheet can be further used to make a triple insulated design that allows for the plastic expansion that is substantially different from the expansion of glass.

BRIEF DESCRIPTION OF THE DRAWINGS

FIG. 32 is a cross-sectional view of the SRT panel of FIG. 30 illustrating the guide/spacer in the lower assembly;

FIG. 33 is a side-view of the SRT panel secured at a upper surface with an elastic material which provides position retention for the laminate while accommodating movement resulting from thermal expansion;

FIG. 34 is a cross-sectional view of the SRT panel of FIG. 33 illustrating the elastic material in the upper assembly;

FIG. 42 is a side-view of a SRT window adapted to pivot about a horizontal or vertical axis;

FIG. 43A is a front-view of a SRT window including a middle SRT pane adapted to slide on a magnetic strip;

FIG. 43B is a cross-section view of one corner of FIG. 43A;

| Drawing Ref. No. | Description |
| --- | --- |
| 10 | SRT panel |
| 11 | Outside substrate |
| 12 | Outside surface |
| 13 | Outside substrate |
| 14 | Outside surface |
| 15 | Inside surface |
| 16 | First substrate |
| 17 | Second substrate |
| 18 | SRT material |
| 19 | Hole |
| 20 | Inside glass |
| 21 | Outside surface of inside substrate |
| 22 | Inside surface of inside substrate |
| 23 | Outside IG gas/vacuum space |
| 24 | Inside IG gas/vacuum space |
| 25 | Polyisobutylene (PIB) |
| 26 | Aluminum foil |
| 27 | Spacer |
| 28 | Adhesive |
| 29 | Aluminum backed tape |
| 30 | Structural adhesive |
| 31 | Capillary tube |
| 32 | Filter |
| 33 | Desiccant |
| 34 | Louvers |
| 35 | Frame |
| 36 | Hinge |
| 37 | Plastic film |
| 38 | Low E coating |

-continued

| Drawing Ref. No. | Description |
| --- | --- |
| 39 | Low E coating |
| 40 | SRT blind |
| 41 | Low E coating |
| 42 | Insulated glass |
| 43 | Structural foam |
| 44 | Vacuum seal |
| 45 | Spring |
| 46 | Metal spacer |
| 47 | Rivet or grommet |
| 48 | SRT sheet |
| 49 | Spring clip |
| 50 | U-groove/Bearing material/spacer |
| 51 | Screen |
| 52 | Post |
| 53 | Gas space |
| 54 | Elastic material |
| 55 | Obscure blind |
| 56 | Tilting, raising and lowering mechanism |
| 57 | Cover to hide edge of SRT plastic and/or springs. |
| 58 | Expandable bladder |
| 59 | Blind spacer |
| 60 | Substrate |
| 61 | Outside surface |
| 62 | Inside surface |
| 63 | Pivot pin |
| 64 | SRT window assembly |
| 65 | Window sash |
| 66 | Vent tube |
| 67 | Pressure equalization tube |
| 68 | Magnetic strip |
| 69 | Oven door |
| 70 | Window insert assembly |
| 71 | Existing window structure |
| 72 | Plastic corner key |
| 73 | Aluminum box spacer |
| 74 | Mechanical fasteners |

DETAILED DESCRIPTION

Figure 1A:
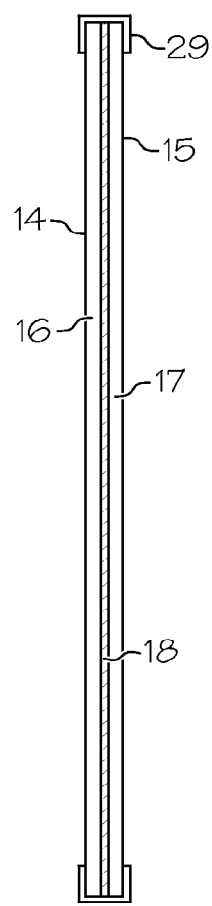
FIG. 1A is a cross-sectional view of an SRT panel with metal tape on the edges.
Figure 1B:
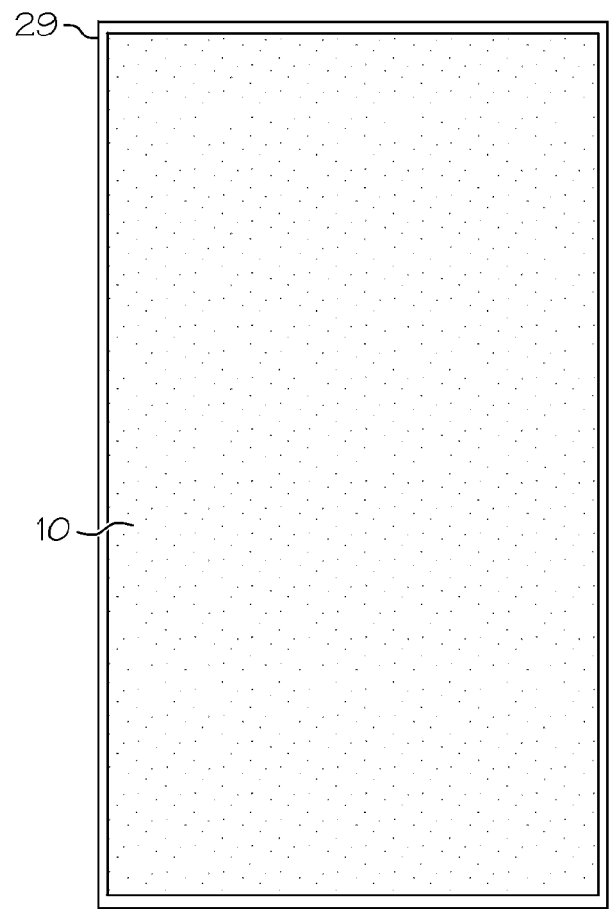
FIG. 1B is a front view of FIG. 1A.

In one aspect of the present invention, a SRT panel 10 includes SRT material 18 disposed between two substrates 16, 17 with metal coated tape 29 sealing the SRT material 18 and two substrates 16, 17 from moisture and air infiltration, as shown in FIG. 1. When configured with IG, the surfaces 14, 15 maybe coated with an anti-reflective coating. Surface 15 may include a low E coating. Substrates 16 or 17 can be clear glass, plastic or any heat absorbing coating such as PPG Solarban 60 with the coating facing the thermochromic layer 18 or away from the thermochromic layer 18. Substrates 16 or 17 made from glass may be heat strengthened, chemically strengthened or tempered. Monolithic substrate surface 14 may include a self-cleaning layer, anti-reflective layer or hard coat low E layer. Surface 15 may include a hard coat low E layer or an aftermarket applied low E film. The SRT panel 10 maybe used in structures such as but not limited to windows, atriums, sunroofs, skylights, etc.

While the laminate 10 illustrated herein has a three layer structure, those skilled in the art will appreciate that a two layer construction is possible in which a layer of an SRT material is carried on a single glass or plastic substrate. Single layer constructions are also possible in which the SRT material is incorporated into a plastic panel or film.

Figure 2:
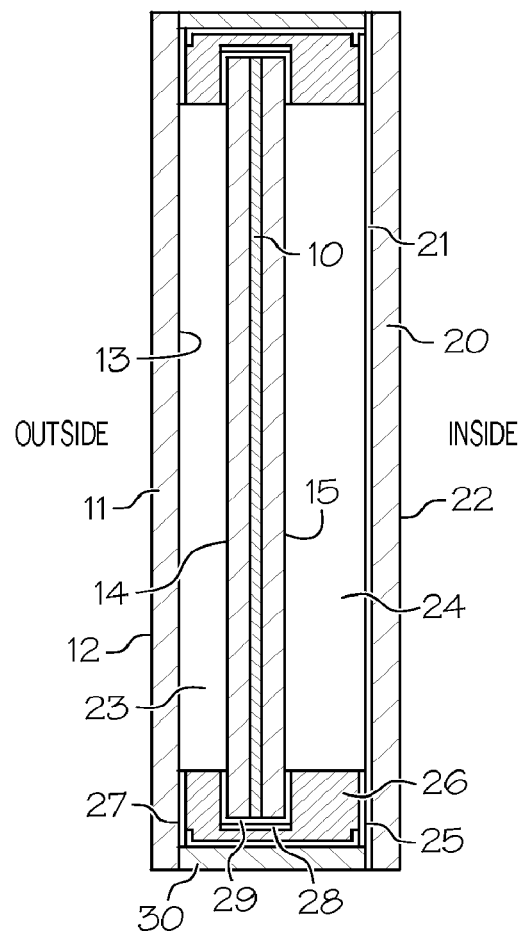
FIG. 2 is a cross-sectional view of an SRT panel in a triple insulated window pane construction.

In another aspect, a SRT panel 10 may be configured in a triple insulated window pane construction as illustrated in FIG. 2. Window pane 11 facing the sun (i.e., facing outside) may be any type of glass or plastics, including but not limited to acrylic, mylar and polycarbonate. The window pane 11 may be clear, tinted, a laminate, thick or thin, hurricane resistant, fire resistant, bomb or bullet resistant, annealed, heat strengthened, tempered, UV blocking, decorative or combinations thereof. The outer pane solar transmission directly affects the energy savings potential and directly influences the performance of the thermochromic layer 10. Window pane 11 can have an outer coating 12 of titanium dioxide for use as a "self-cleaning" action for the glass. The outer coating 12 may be a thin layer of tin oxide to inhibit condensation from forming. The outer coating 12 and inner coating 13 of the window pane 11 may include anti-reflective coating compositions to reduce reflections. The thermochromic layer 10 may be depicted as a laminate with either substrate being glass or plastic. Surfaces 14, 15 may be coated with an anti-reflective coating to reduce internal reflections. The window pane closest to the inside 20 can be glass or plastic with surface 21 being a low E coating. The low E coating may be either a hard coat or soft coat depending on energy savings and visibility requirements. Window pane surfaces 15, 13 and 14 may also include a low E coating. Window pane 20 may alternatively be a laminate adapted with a clear glass, privacy glass or decorative glass. Privacy types of glass include Thermosee™ (by Pleotint), polymer dispersed liquid crystal or cholesteric liquid crystal types. Spaces 23, 24 formed between the window panes 11, 20 may include air, argon, krypton or combinations thereof. Depending on the desired SRT panel 10 performance, the spaces 23, 24 between the window panes 11, 20 may include any highly insulating gas, any highly conductive gas, a vacuum or aerogel.

Spaces 23, 24 may be the same dimension or can be different dimensions depending on the energy savings or energy capturing results desired. Spaces 23, 24 may have a vent tube 31 or capillary tube 31 inserted to relieve pressure buildup as desired (see FIG. 4). A polyisobutylene (PIB) composition 25 may be used to seal the thermochromic window pane to the outer 11 and inner 20 window panes. PIB 25 may be used to seal the gas inside the space. An aluminum or metalized foil tape 26 may be used to seal the inner spaces from moisture penetration. Structural foam 27 may be used to space the inner SRT window pane at a predetermined width for a fixed performance. Other types of spacer material such as but not limited to wood, aluminum, aluminum with thermal break, fiberglass, steel, stainless steel, structural foam, corrugated strip or other insulating means known in the art may be used. The design may accommodate the thermal expansion of the SRT layer 10 as it warms while maintaining the seal for the insulated glass window. An adhesive strip 28 may be added to the groove that holds the SRT window pane. This adhesive 28 will give stability to the spacer 27 during the application process and also in operation. An aluminum or metalized backed tape 29 may be used to protect the SRT window pane from air and moisture penetration. A structural adhesive 30 made of materials such as but not limited to silicone, polysulphide, butyl rubber may be applied using hot melt or other known application method to hold the inner window pane and outer window pane together. The SRT panel 10 because of its absorbing nature, if made with glass, may be heat strengthened or tempered glass, the need for any of the other glass layers 11, 20 to be tempered or heat strengthened may or may not be required. Plastic does not require heat treatment. A double seal, single seal or other sealing means known in the art may be used to hold the inner window pane 20 and outer window pane 11 together.

Figure 3:
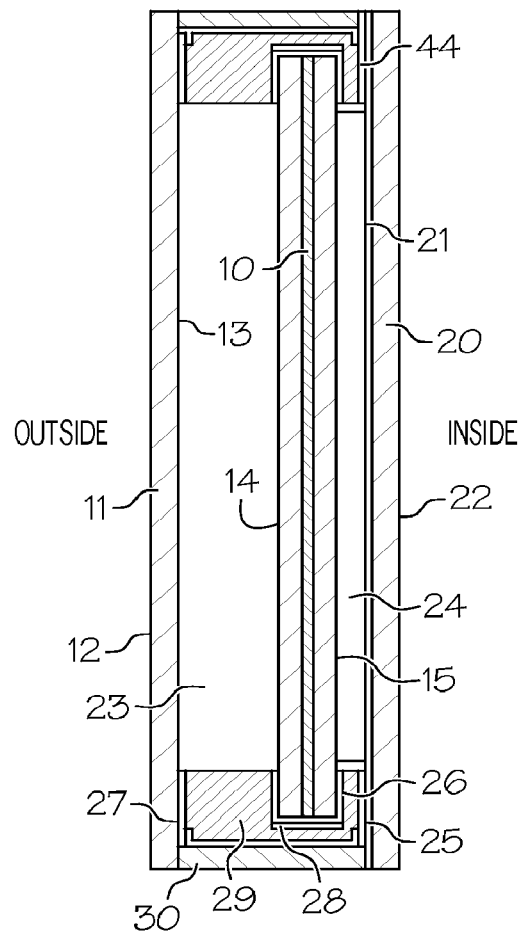
FIG. 3 is a cross-sectional view of the SRT panel of FIG. 2 showing a vacuum seal.

FIG. 3 shows the SRT panel 10 illustrated in FIG. 2 further including a vacuum seal 44 between the inside glass 20 and the SRT panel 10. One surface of the vacuum glass 20 may include a low E coating, with the low E coating facing the evacuated space.

Figure 4:
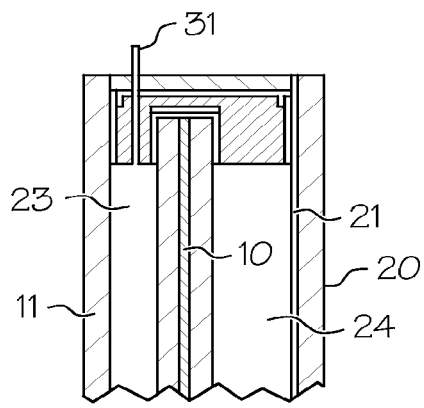
FIG. 4 is a cross-sectional view of the SRT panel of FIG. 2 showing a capillary or vent tube located within the air space closest to the outside.

FIG. 4 shows the SRT panel 10 illustrated in FIG. 2 having another aspect, namely a capillary tube 31 located within the air space 23 closest to the outside pane 11. As the gas in space 23 warms the pressure will increase if not relieved. The capillary tube 31 allows the air space 23 to equalize pressure as the SRT panel 10 warms the gas in the space 23, as well as restricts moisture ingress into the space 23. The relieved air pressure also allows the window pane 11 to remain parallel without bowing typically caused by atmospheric pressure changes and internal pressure changes due to temperature increases of the SRT pane 10. In another aspect, a capillary tube 31 or vent tube 31 may be constructed to incorporate a hydrophilic membrane to let air pass yet restrict the passage of water vapor.

Figure 5:
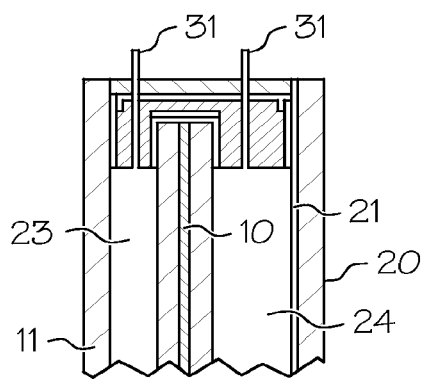
FIG. 5 is a cross-sectional view of the SRT panel of FIG. 2 showing capillary or vent tubes within both air spaces.

FIG. 5 shows the SRT panel 10 illustrated in FIG. 2 including capillary or vent tubes 31 within both gas spaces 23, 24 such that both spaces may be relieved of atmospheric and thermal expansion pressure build-up. As atmospheric pressure changes, the pressure inside a sealed IG unit 23, 24 will increase or decease accordingly. Also the heating and cooling of the gas in the sealed space 23, 24 will cause pressure to fluctuate. This action is compounded by the SRT panel 10 expansion as it warms with direct sunlight exposure.

Figure 6:
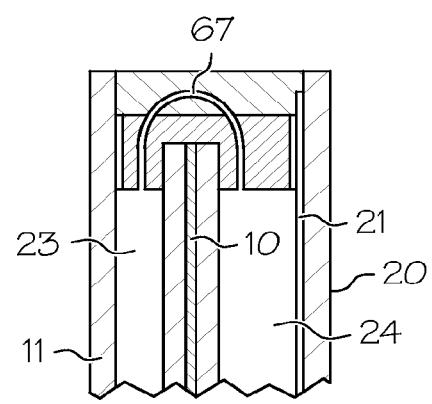
FIG. 6 is a cross-sectional view of the SRT panel of FIG. 2 showing a pressure equalization tube connecting both air spaces.

FIG. 6 shows the SRT panel 10 illustrated in FIG. 2 including a pressure equalization tube 67 connecting both gas spaces 23, 24 to maintain both spaces at equal pressures. The pressure inside a sealed IG unit 23, 24 will increase or decrease due to the heating and cooling of the gas in the sealed space 23, 24. This action is compounded by the SRT panel 10 expansion as it warms with direct sunlight exposure, while the outer 11 and inner window panes 20 may be at significantly different temperatures. In another aspect, a pressure equalization tube 67 compensates for the differential temperature of the gas in the spaces 23, 24 as the SRT panel 10 warms due to absorbing sunlight.

Figure 7:
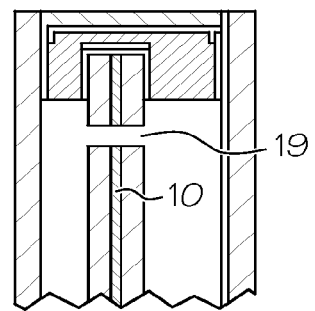
FIG. 7 is a cross-sectional view of the SRT panel of FIG. 2 illustrating an aperture in the SRT pane operable to equalize air pressures.

FIG. 7 shows the SRT panel 10 illustrated in FIG. 2 including an aperture 19 or hole 19 in the glass or plastic SRT pane 10 operable to equalize air pressures.

Figure 8:
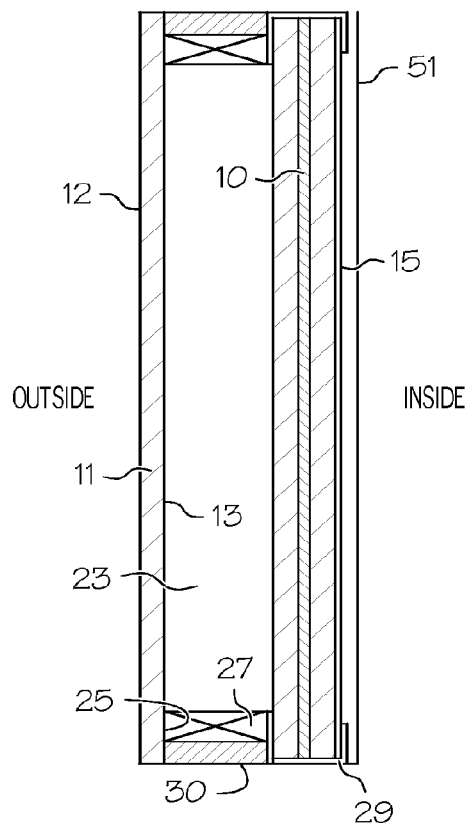
FIG. 8 is a cross-sectional view of an SRT panel in a double insulated window pane construction.

In another aspect, a SRT panel 10 may be configured in a double insulated window pane construction, as shown in FIG. 8. Double IG construction may be particularly cost effective for applications such as but not limited to sunroofs, skylights, atriums and casement types of residential windows. The window pane 11 facing the sun may be any type of glass or plastic, clear, tinted, a laminate, thick or thin, hurricane resistant, fire resistant, bomb or bullet resistant, annealed, heat strengthened, tempered, UV blocking or decorative. Surface 12 may be a coating of titanium dioxide adapted to provide a self-cleaning glass or a coating of tin oxide to prevent condensation formation. Surfaces 12, 13 may include an antireflective coating to reduce reflections. The thermochromic layer 10 may be depicted as a laminate 10 with either surface 14, 15 being glass or plastic. The inside surface 15 may include a low E coating, and more preferably a hard coat low E coating as the hard coat provides improved durability compared to a soft coat low E coating that is exposed to air.

Space 23 formed between the window panes may include a gas, such as but not limited to air, argon, krypton, highly insulating gas, highly conductive gas or combinations thereof, as well as a vacuum depending on the SRT performance desired. Space 23 may include a vent tube 31 or capillary tube 31 inserted therein to relieve any pressure buildup if desired (not shown). Alternatively, a polyisobutylene seal 25 may be used to seal the space 23. Spacer material 27 can be used to dispose the inner SRT window pane 10 at a predetermined width for a fixed performance, wherein the material may include but is not limited to structural foam, wood, aluminum, aluminum with thermal break, fiberglass, steel, stainless steel, corrugated strip, etc. An aluminum backed tape 29 may be used to protect the SRT window pane 10 from air and moisture penetration. A structural adhesive 30 may be used to hold the inner window pane and outer window pane together, the adhesive material 30 may be but is not limited to silicone, polysulphide, butyl rubber, a hot melt adhesive or other sealing means known in the art. In another aspect, a screen 51 may be used as a restraint from touching when the glass is hot, as well as an insect barrier when the functional window is open.

Figure 9:
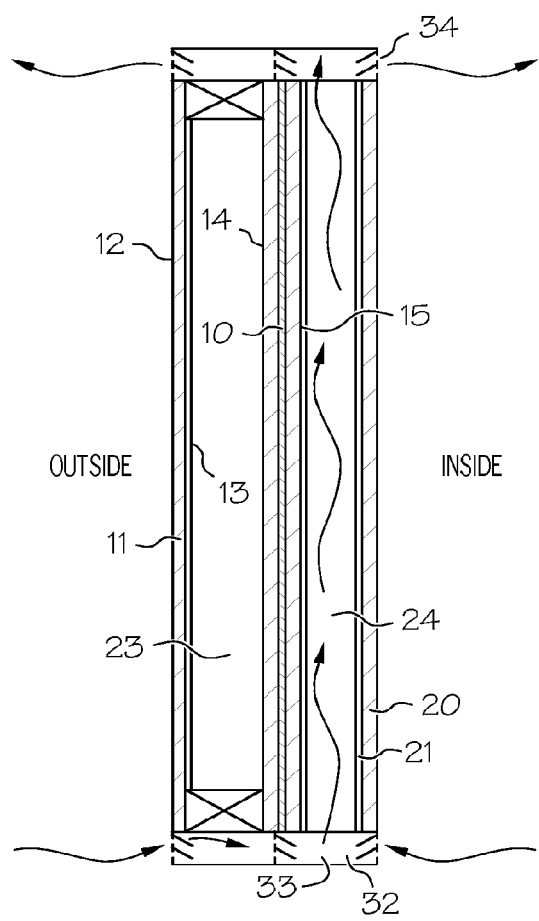
FIG. 9 is a cross-sectional view of the SRT panel of FIG. 2 illustrating convective air flow against the innermost side of the SRT pane.

FIG. 9 shows the SRT panel 10 illustrated in FIG. 2, having another aspect, namely a convective air flow against the innermost side of a SRT pane 10 to transfer heat away from the air space 24 and insulated window pane 20. Alternatively, the SRT panel 10 may be adapted such that convective air flows against the outermost side of the SRT pane 10 to transfer heat away from the air space 23 and the outer insulated window pane 11. In another aspect, manual or automated louvers 34 may be added to the top or bottom or both to control the air flow between the SRT panel 10 and window pane 20. The heated air may be directed inside or outside based on the need for heating or cooling, or closed by either a manual or automatic control system directing the air movement. The air movement may be either natural convection or forced air, wherein the forced air configuration may be obtained by means of a mechanical fan (not shown).

Space 23 formed between the window panes 10, 11 may be air, argon, krypton or combinations of gases, any highly insulating gas or any highly conductive gas, or a vacuum depending on the SRT insulating performance desired. Additionally a rechargeable desiccant 33 and/or a replaceable or cleanable air filter 32 may be added to filter the air passing into and through the window panes 10, 20 keeping moisture and dirt from entering. Alternatively, in space 24 the system may be designed to circulate a gas through a closed system with a heat exchanger (not shown). This design can be readily adapted into a second skin on a commercial building. In another aspect, using a second hard coat low E in space 24 on surface 15 can increase absorbance of the SRT pane 10. Adding a low E coating to surfaces 13, 14 can also raise the temperatures the SRT panel 10. Control schemes to activate the louvers 34 may be incorporated to open and close the louvers 34 based on temperature, sunshine or time of day. A window design that allows the inside pane 20 to be removed provides access to clean the SRT panel is a further aspect of the design.

Figure 10:
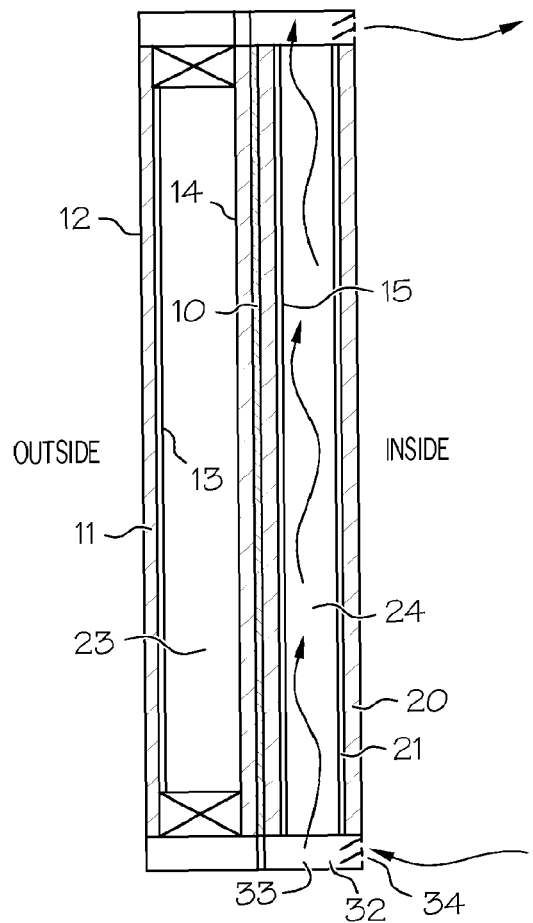
FIG. 10 is a cross-sectional view of the SRT panel of FIG. 9, further including a ventable louvered chamber wherein the convective airflow may be discharged or contained.

FIG. 10 shows the SRT panel 10 illustrated in FIG. 9, further including a ventable louvered chamber 34 wherein the convective airflow against window pane 20 may be discharged or contained. The heated air may be directed through the space 24 and flow between window panes 10, 20 and back inside the room or kept contained within the space 24 based on the need for heating or cooling by manual opening louvers 34 or by louvers designed to open with minimal air movement only in one direction, to let cold air in when the SRT panel 10 is warm and trap air when the SRT layer 10 is cold. The air movement may be either natural convection or forced air. Space 23 formed between the window panes 10, 11 can be air, argon, krypton or combinations of gasses, any highly insulating gas or any highly conductive gas, or a vacuum depending on the SRT performance desired. Additionally, a rechargeable desiccant 33 and/or a replaceable or cleanable air filter 32 may be added to filter the air passing into and through the window panes 10, 20 as well as keeping moisture and dirt from entering. Alternatively in space 24 the system can be designed to circulate a gas through a closed system with heat exchanger (not shown). The design may be readily incorporated into existing windows primarily for the residential market.

In another aspect, using a second hard coated low E material on surface 15 within space 24 can increase heat absorbance on surface 14 and may raise the temperatures on the SRT panel 10. Control schemes to activate the louvers 34 could also be incorporated to open and close based on temperature, sunshine or time of day. The window pane 20 may be configured to be removable for cleaning purposes.

Figure 11:
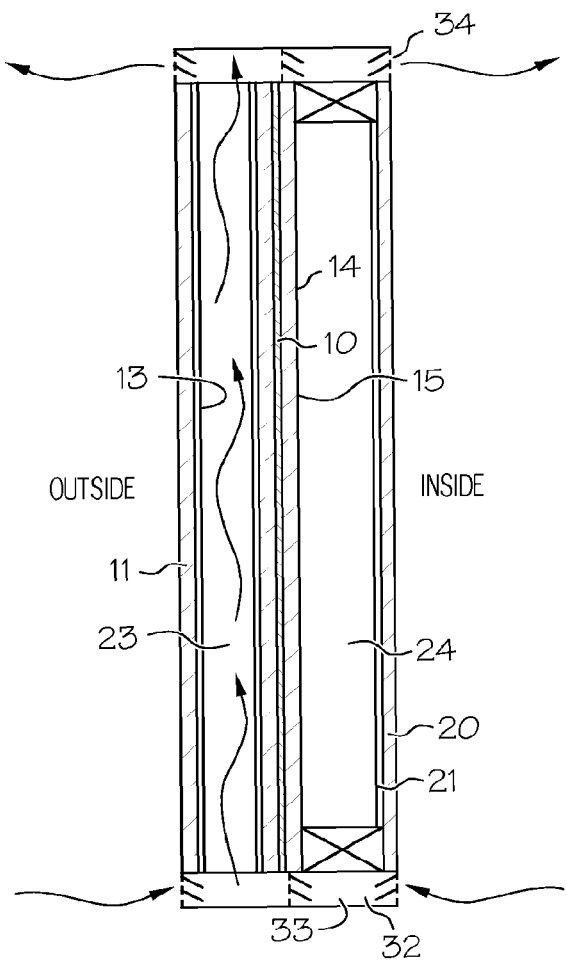
FIG. 11 is a cross-sectional view of the SRT panel of FIG. 2 illustrating convective air flow against the outermost side of the SRT pane.

FIG. 11 shows the SRT panel 10 illustrated in FIG. 2 including convective air flow between the outermost side of the SRT pane 10 and outside window pane 11. The heated air may be directed through the space 23 and flow between window panes 10, 11 and back inside the room or kept contained within the space 23 based on the need for heating or cooling by manual opening louvers 34 or by louvers 34 designed to open with minimal air movement only in one direction, to let cold air in when the SRT panel 10 is warm and trap air when the SRT layer 10 is cold. The air movement may be either natural convection or forced air.

Space 23 formed between the window panes 10, 11 can be air, argon, krypton or combinations of gasses, any highly insulating gas or any highly conductive gas, or a vacuum depending on the SRT performance desired. Additionally, a rechargeable desiccant 33 and/or a replaceable or cleanable air filter 32 may be added to filter the air passing into and through the window panes 10, 11 as well as keeping moisture and dirt from entering. Alternatively in space 23 the system can be designed to circulate a gas through a closed system with heat exchanger (not shown). The design may be readily incorporated for adding a second skin in a commercial building. In another aspect, using a second hard coated low E material on surface 14 within space 23 can trap heat. Adding a low E material to surface 13 may raise the temperatures on the SRT panel 10. Control schemes to activate the louvers 34 could also be incorporated to open and close based on temperature, sunshine or time of day.

Figure 12:
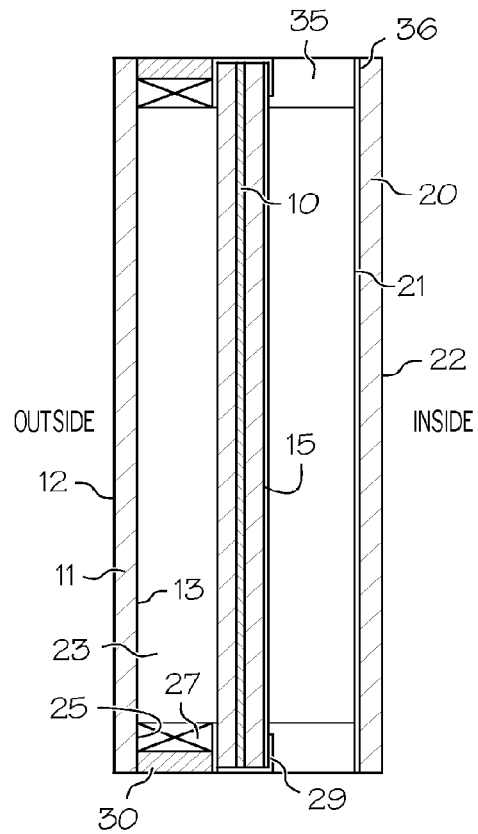
FIG. 12 is a cross-sectional view of the SRT panel of FIG. 2, further including an innermost pane wherein the innermost pane may be opened or closed.
Figure 13:
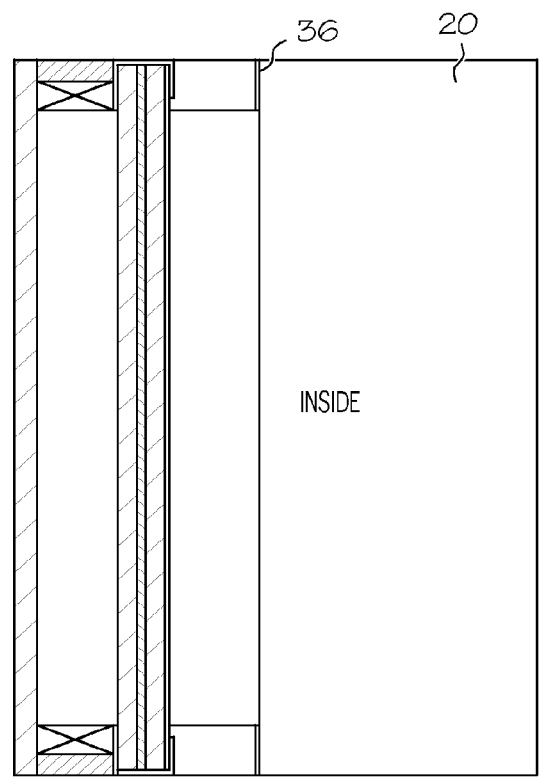
FIG. 13 is a cross-sectional view of the SRT panel of FIG. 12 illustrating the innermost pane in an opened position.

In another aspect, FIG. 12 shows the SRT panel 10 illustrated in FIG. 2, further including an innermost pane 20 wherein the innermost pane 20 may be opened (as shown in FIG. 13) or closed (as shown in FIG. 12). A modified triple glass IG may be used to capture heat in the SRT layer 10 when the sun shines and allows heat entry to the building by manually opening the inside pane 20. The inside pane 20 may be hinged 36 having a hard coated low E surface 21 facing outwardly. At night the pane 20 is closed to maximize the thermal insulation. During sunlight conditions the pane 20 may be opened to allow more sunlight into the building or it may be closed to allow the SRT layer 10 to get warm. Furthermore, the pane 20 may be opened when the sun is setting to allow the heat gain built up in the SRT layer 10 to enter the room. Not having a low E coating material on surface 21 will allow some heat to enter the room whenever the sun shines by direct radiation and natural convection.

Figure 14:
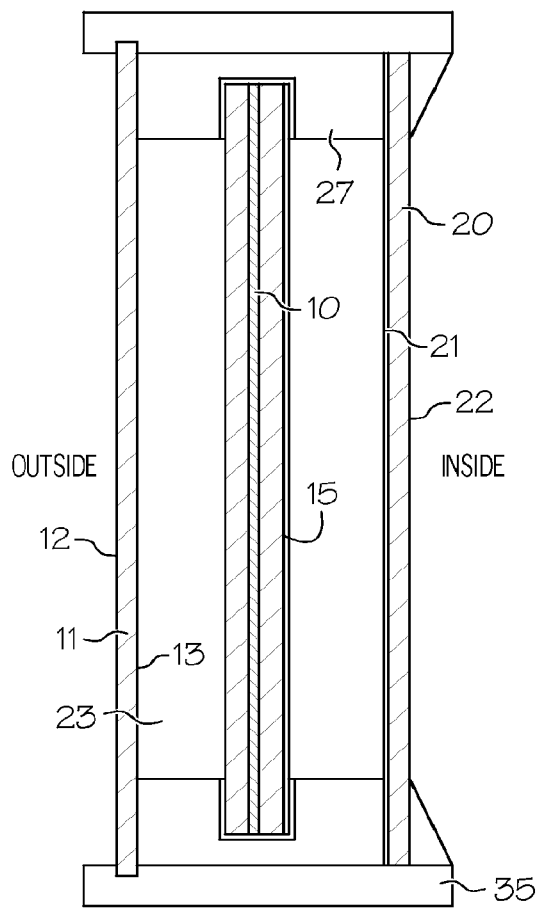
FIG. 14 is a cross-sectional view of a SRT panel of FIG. 2 illustrating a removable or replaceable middle SRT pane.

In another aspect, FIG. 14 shows the SRT panel 10 illustrated in FIG. 2 including a removable or replaceable/reversible middle SRT pane 10. Pane 11 is fixed in a frame 35. SRT panel pane 10 is disposed or attached to pane 11 by compression, magnetic strips or other means to hold it in a spaced apart relationship to pane 11 and pane 20 yet when pane 20 is opened, pane 10 will be removable. Surfaces 15, 21 may be coated with a hard coat low E material to withstand the elements when pane 20 is opened and to inhibit some heat flow from the SRT pane 10.

Figure 15:
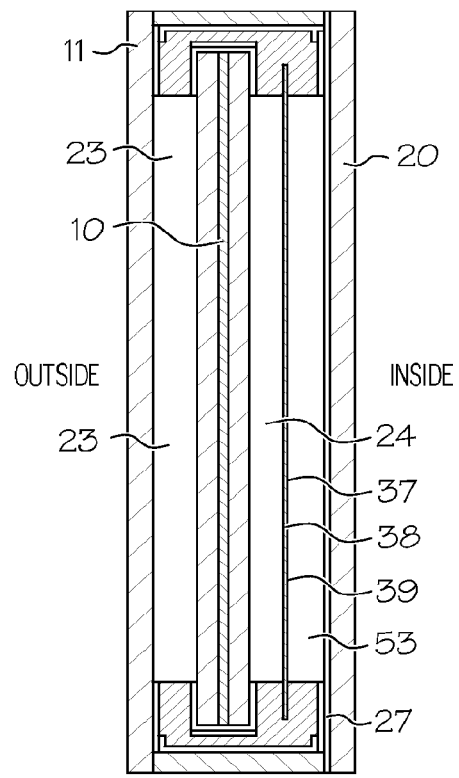
FIG. 15 is a cross-sectional view of a SRT panel having a quadruple pane IG including a heat mirror plastic or multi-pane glass structure.

In another aspect, FIG. 15 shows a SRT panel 10 having a quadruple pane IG including a heat barrier plastic film 37 or a multi-pane (three or more panes) glass structure. A representative example of the heat barrier plastic film 37 includes Heat Mirror™ (supplied from Southwall Technologies, Palo Alto, Calif.). The heat barrier layer 37 may have low E properties on surface 38 or surface 39 or both or neither. Spacer material 27 may be adapted to accommodate the differential thermal expansion of the SRT layer 10.

Figure 16:
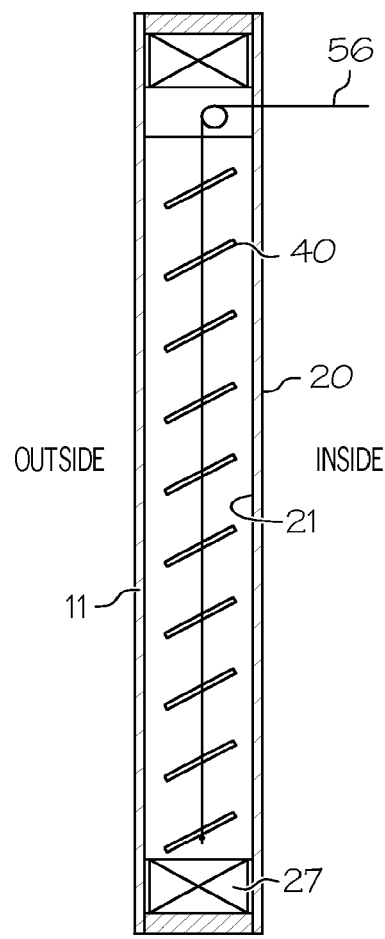
FIG. 16 is a cross-sectional view of a SRT plastic laminate adapted to include a venetian blind, wherein the blind may be configured between glass and function to reduce solar gain when closed yet can be operable to open or retract as desired.

In another aspect, FIG. 16 shows a SRT plastic laminate 10 adapted to include a venetian blind 40, wherein the blind 40 may include an SRT material and may be configured between glass panes 11, 20 and function to reduce solar gain when closed yet can be operable to open or retract (i.e., raised or lowered) as desired by manual or automatic control means 56. This configuration allows full view even at full sunlight or reduced view based on the position and angle of the SRT blind 40. When disposed in a down and closed position, the blind 40 will absorb sunlight and go from full transmission to a reduced transmission based on the sun exposure. The SRT blinds 40 may be preferably sealed in the space between window panes 11, 20, although it is recognized in some cases the space between window panes 11, 20 will not be sealed. In the situation where the space is sealed, a soft coating low E material such as Solarban 60 from PPG is preferred for surface 21. In the case of an unsealed space, the use of a hard coat low E material available from PPG (Sungate 500) or Pilkington (Energy Advantage) is preferred for surface 21. SRT blinds 40 made in the form of Venetian blinds combined with ThermoSEE™ (Pleotint) will provide solar control when warm and privacy when cool.

Figure 17:
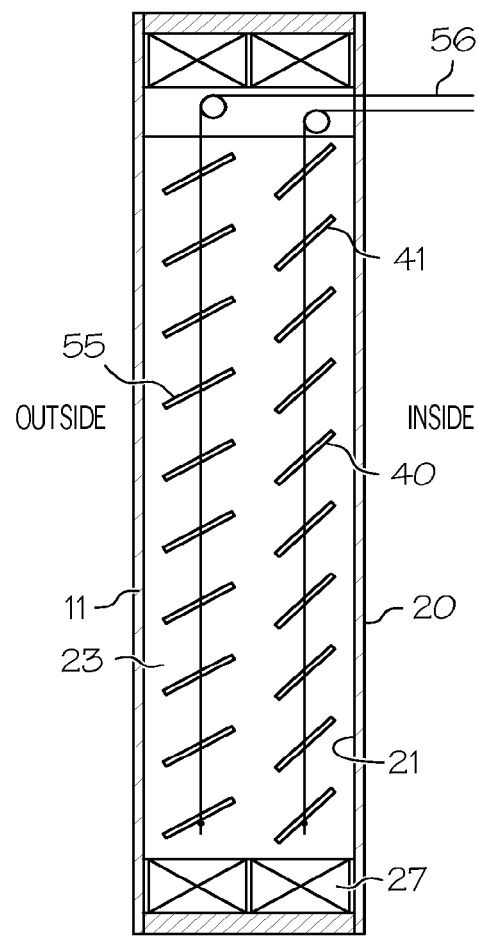
FIG. 17 is a cross-sectional view of the SRT plastic laminate of FIG. 16 illustrating a second set of blinds operable to provide privacy as desired, wherein the second set of blinds may be disposed facing outwards.
Figure 18:
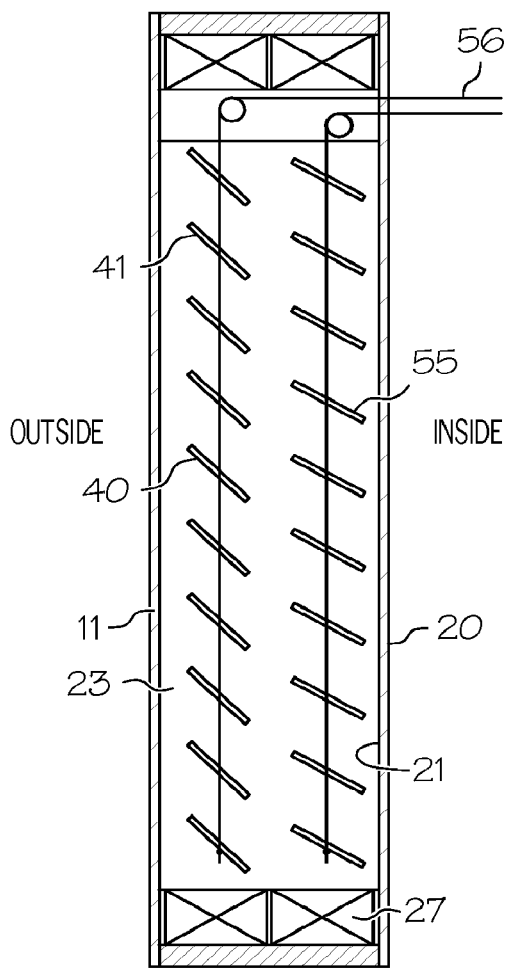
FIG. 18 is a cross-sectional view of the SRT plastic laminate of FIG. 16 illustrating a second set of blinds operable to provide privacy as desired, wherein the second set of blinds may be disposed facing inwards.

In another aspect, FIGS. 17 and 18 show the SRT plastic laminate 10 illustrated in FIG. 16 further including a second set of blinds 55 operable to provide privacy as desired. The privacy blind 55 may be disposed between and the solar control blind 40 and the outside (as seen in FIG. 17) or vice versa (as seen in FIG. 18). In a preferred aspect, the privacy blind 55 is disposed between the solar control blind 40 and the outside. Alternatively, the blinds 40, 55 may be substituted with operable shades that raise and lower. In another configuration, at least one blind and one shade may be used for purposes of solar control and privacy. Blinds 40, 55 may be sealed in the air space 23 and operated.

Figure 19:
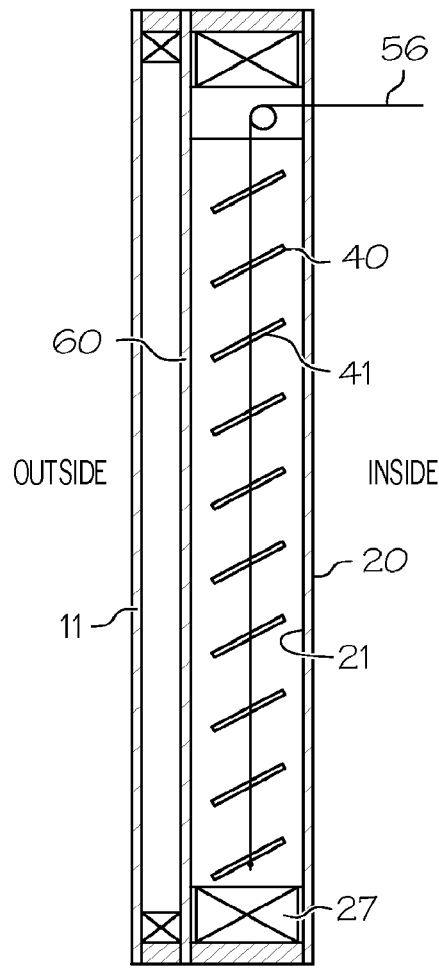
FIG. 19 is a cross-sectional view of the SRT plastic laminate of FIG. 16 adapted to include a sealed IG for insulating purposes, wherein the sealed IG may be disposed between the glass panes and function to reduce solar gain when closed yet can be operable to open or retract as desired.
Figure 20:
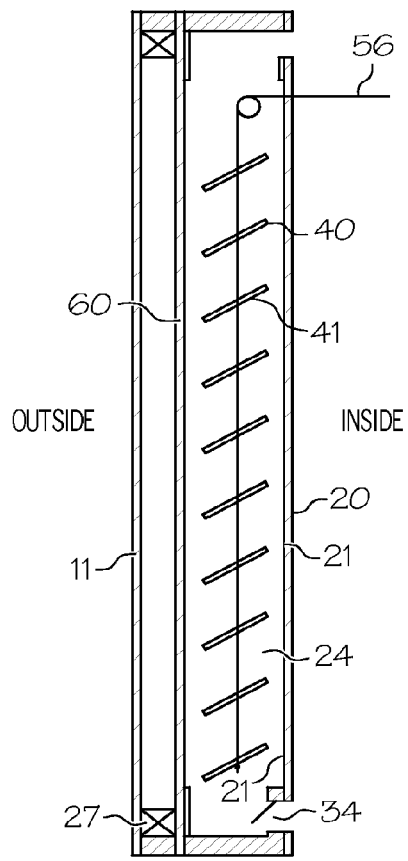
FIG. 20 is a cross-sectional view of the SRT plastic laminate of FIG. 19 adapted to include louvers operable to capture and direct the heat away from the air gap between the SRT pane and the inner glass pane.
Figure 21:
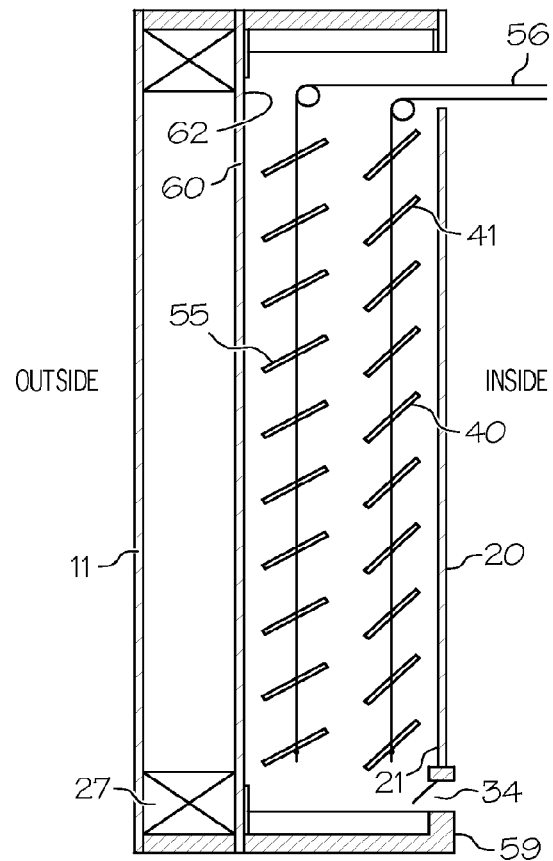
FIG. 21 is a cross-sectional view of the SRT plastic laminate of FIG. 20 illustrating a second set of blinds operable to provide privacy as desired, wherein the second set of blinds may be disposed facing inwards.

In another aspect, FIG. 19 shows the venetian blind 40 as illustrated in FIG. 16 combined with a sealed IG 60 on the outside for improved thermal control. FIG. 20 shows the venetian blinds 40 and sealed IG pane 60 illustrated in FIG. 19 adapted to include louvers 34 operable to capture and direct the heat away from the air gap 24 between the SRT blinds 40 and the inner glass pane 20. FIG. 21 shows the venetian blinds 40, privacy blinds 55 and sealed IG pane 60 illustrated in FIG. 17 adapted to include louvers 34 operable to capture and direct the heat away from the air gap between the SRT blinds 40 and the inner glass pane 20.

Figure 22:
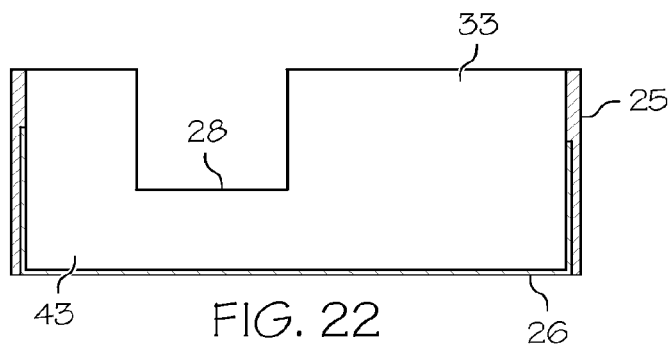
FIG. 22 is a cross-sectional view of structural foam operable for thermal expansion and low heat transfer purposes and adapted to contain a preferred IG pane shape including integral aluminum foil/moisture seal and desiccant.

In another aspect, FIG. 22 illustrates structural foam 43 in the preferred IG shape with integral aluminum or metalized foil 26 and desiccant 33. The spacer 43 is preferably made of structural silicone foam, in a shape made to set the SRT layer 10 in the proper position for maximum insulation and solar hear gain control. The structural foam 43 should have a metal or metalized foil barrier 26 the side opposite where the SRT layer 10 is fit. An adhesive 28 can be applied to hold the SRT layer 10 in place. The structural foam 43 may have an integral desiccant 33 and an applied sealant of PIB 25 to inhibit moisture and gas migration.

Figure 23:
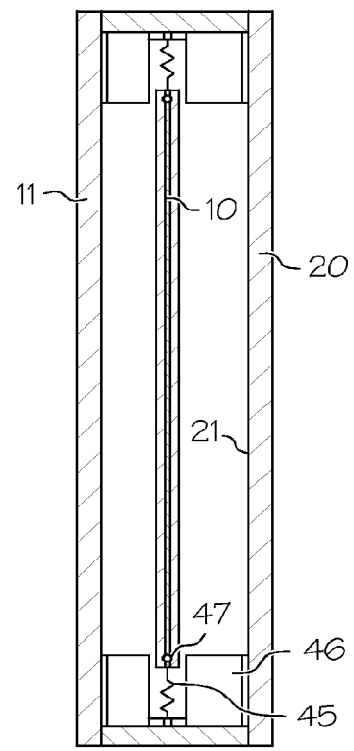
FIG. 23 is a cross-sectional view of the SRT plastic laminate of FIG. 14 wherein the SRT panel may be held in position by springs to accommodate the differential thermal expansion between glass and plastic.

In another aspect, FIG. 23 shows a SRT plastic laminate 10 suspended by springs 45 between two outer window panes 11, 20 with window pane 20 having a low E layer 21 facing the SRT plastic laminate 10. The springs 45 are attached to the outer spacer material 46 and preferably placed on all four sides to tension the SRT plastic laminate 10. Spacer 46 also serves as a guide to keep the SRT panel 10 spaced apart from window panes 11, 20 and allow thermal expansion movement without binding. A rivet 47 (or other means to keep the plastic sheet secure without tearing) made of metal provides a secure attachment to the SRT panel 10. Springs 45 on just two sides or even a spring 45 on the top, with gravity causing the tension, can also be employed.

Figure 24:
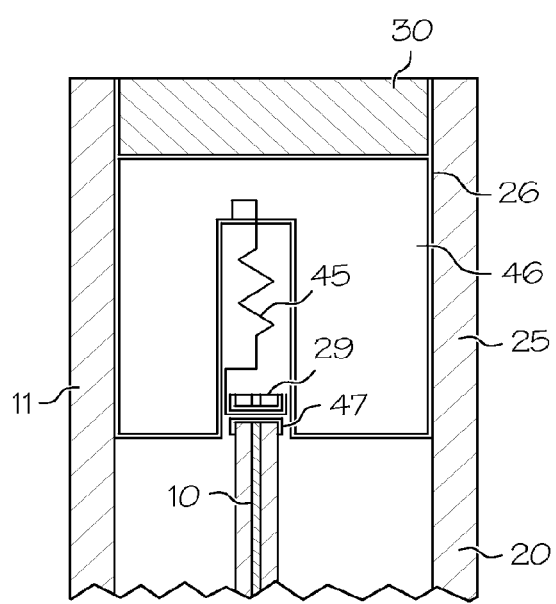
FIG. 24 is a magnified cross-sectional view of the upper spring assembly of the SRT plastic laminate of FIG. 23.
Figure 25:
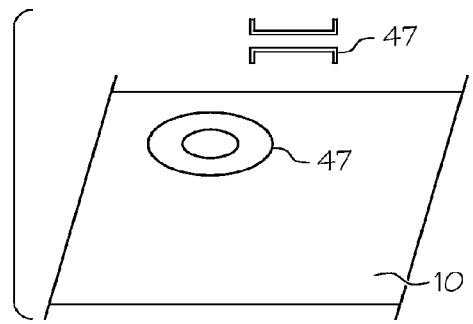
FIG. 25 is a top view of the rivet or grommet used to secure the springs to the SRT panel.
Figure 26:
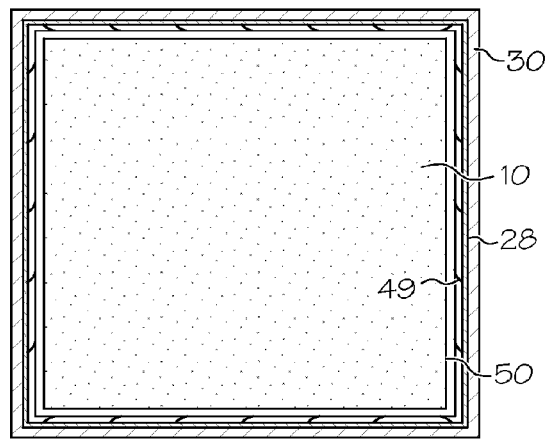
FIG. 26 is a side view of the SRT glass or plastic laminate held in position by spring clips.
Figure 27:
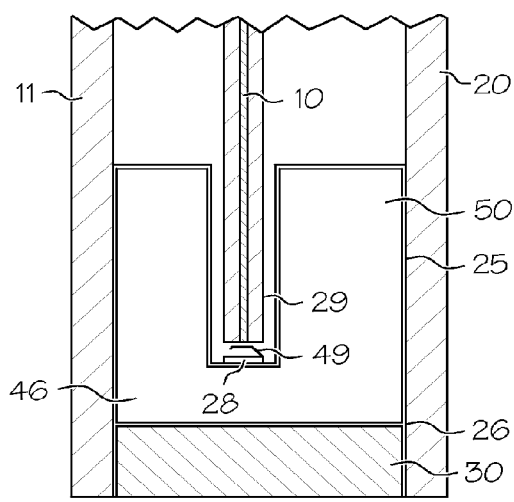
FIG. 27 is a cross-sectional view of the SRT panel illustrating the spring clips.
Figure 28:
FIG. 28 is a side-view of a plurality of spring clips.
Figure 29:
FIG. 29 is a side view of an individual spring clip.

FIG. 24 illustrates the upper spring assembly of the SRT plastic laminate 10 of FIG. 23. FIG. 25 shows the rivet or grommet used to secure the springs 45 to the SRT panel 10. In another aspect, FIG. 26 shows the SRT glass or plastic laminate 10 held in position using spring clips 49 which tension by compression around the edges. The thermal expansion is taken up by the spring clips 49 between the SRT panel 10 and the spacer 50. U-groove 50 made from a slippery plastic material can be substituted for the spacer 50 to allow freer movement of the SRT plastic 10 within the IG. FIG. 27 illustrates the lower spring assembly of the SRT plastic laminate 10 of FIG. 23. FIG. 28 illustrates a plurality of spring clips 49 and FIG. 29 illustrates an individual compression spring clip 49.

Figure 30:
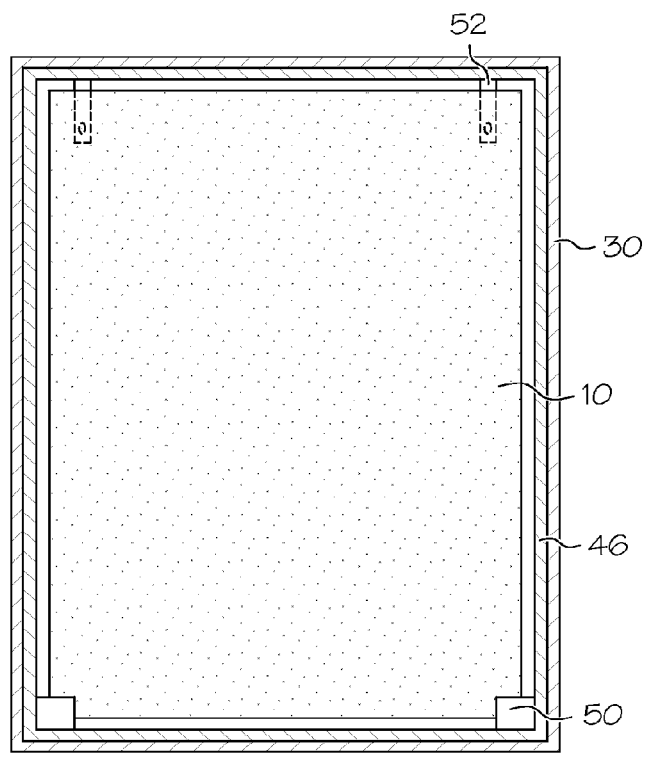
FIG. 30 is a side-view of the SRT panel secured at a upper surface with a post which provides position retention for the laminate while accommodating movement resulting from thermal expansion.
Figure 31:
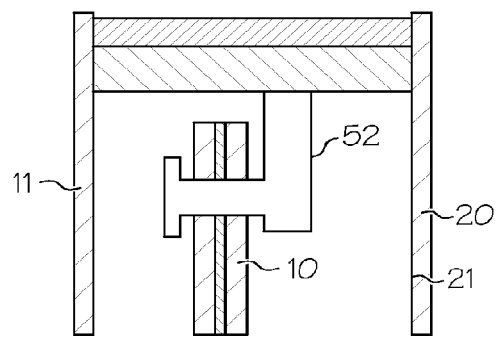
FIG. 31 is a cross-sectional view of the SRT panel of FIG. 30 illustrating the upper post assembly.

In another aspect, FIG. 30 shows an SRT plastic laminate 10 held by fixed posts 52 and tensioned by gravity and the weight of the SRT panel. A guide/spacer 50 may be positioned to allow for thermal expansion and act as a guide to keep the SRT panel in place and spaced apart from the other surfaces. Guide/spacer 50 can be made out of a material such as Teflon, or other material that allows free movement of the SRT plastic laminate 10 without binding. FIG. 31 shows the SRT panel 10 of FIG. 30 illustrating the upper post assembly 52. FIG. 32 shows the SRT panel 10 of FIG. 30 illustrating the guide/spacer 50 in the lower assembly.

In another aspect, FIG. 33 shows the SRT panel 10 secured at an upper surface with an elastic 54 material which provides position retention for the laminate 10 while accommodating movement resulting from thermal expansion. The elastic 54 material maintains tension using gravity and the weight of the SRT panel 10. FIG. 34 shows the SRT panel 10 of FIG. 33 having elastic material 54 disposed at an upper surface.

Figure 35:
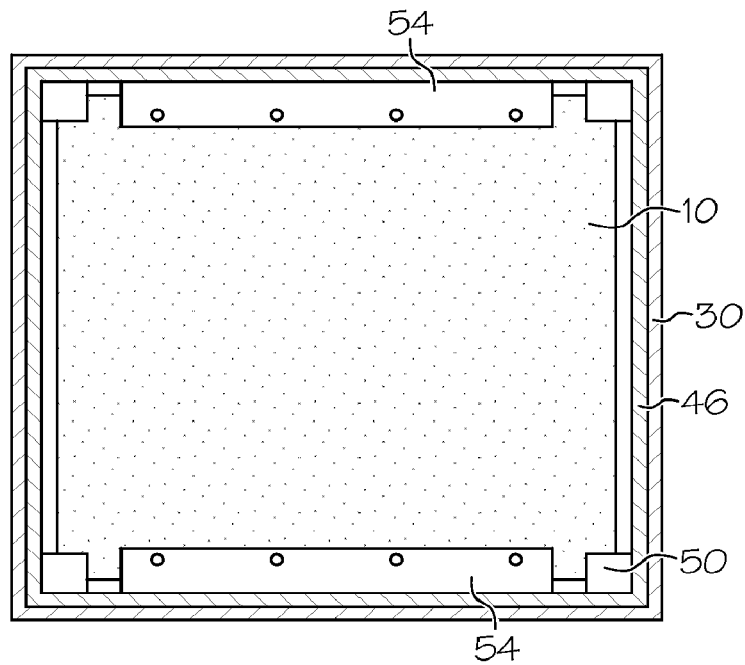
FIG. 35 is a side-view of the SRT panel of FIG. 33 adapted to include a second securing surface having an elastic material which provides position retention for the laminate while accommodating movement resulting from thermal expansion.
Figure 36:
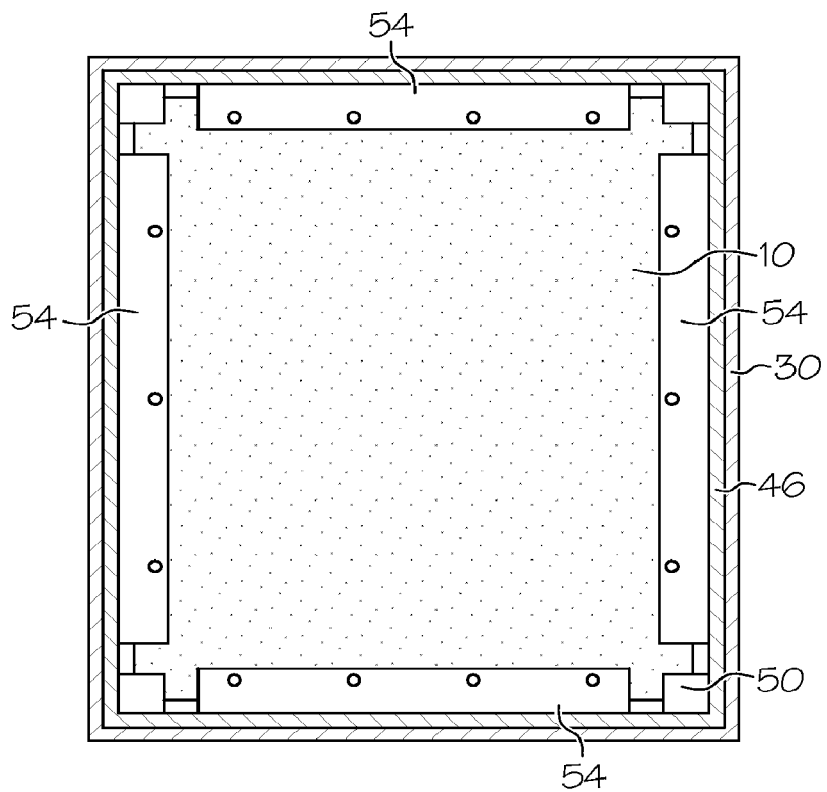
FIG. 36 is a side-view of the SRT panel of FIG. 33 adapted to include a plurality of securing surfaces having elastic materials which provide position retention for the laminate while accommodating movement resulting from thermal expansion.
Figure 37:
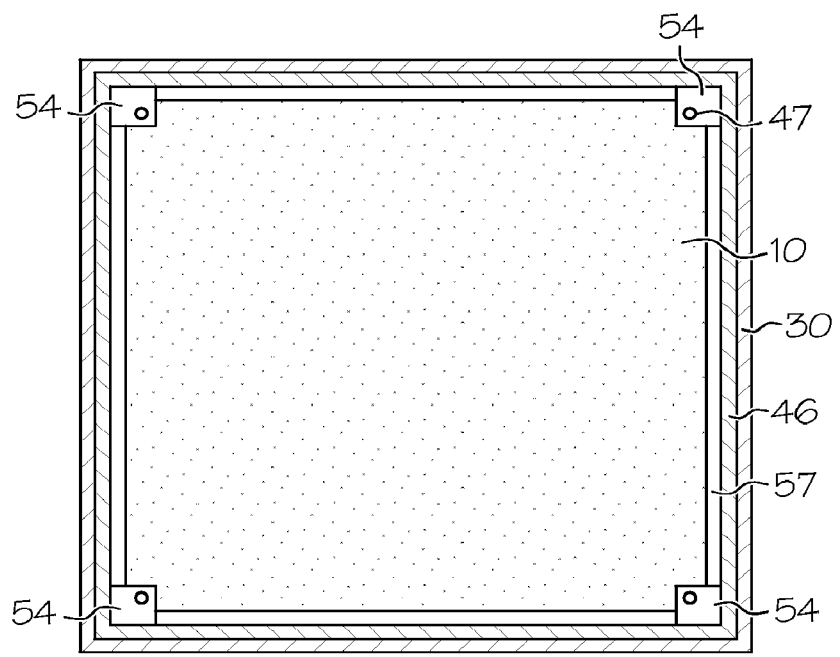
FIG. 37 is a side-view of a SRT panel secured at four corners using an elastic material.

FIG. 35 shows the SRT panel 10 of FIG. 33 adapted to include elastic material 54 in both top and bottom locations which provides position retention for the laminate 10 while accommodating movement resulting from thermal expansion. FIG. 36 shows the SRT panel 10 of FIG. 33 adapted to include elastic materials 54 on all four sides which provides position retention for the laminate 10 while accommodating movement resulting from thermal expansion. FIG. 37 shows a SRT panel 10 secured at four corners using an elastic material 54.

Figure 38:
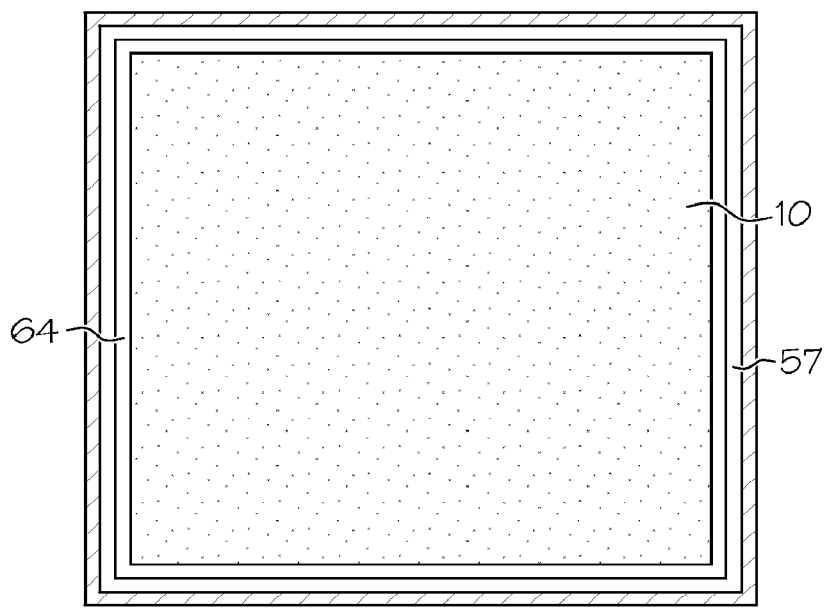
FIG. 38 is a side-view of a SRT panel secured at four corners using a decorative edge (i.e., silk-screened paint or other design) to hide the open area between the SRT pane and the edge of the window.
Figure 39:
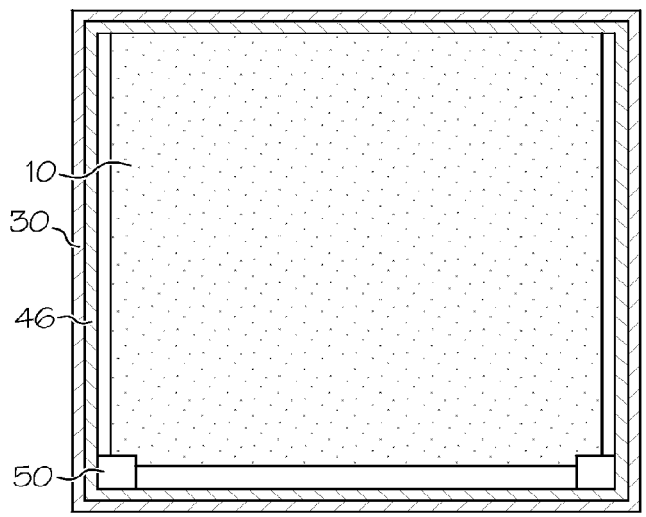
FIG. 39 is a side view of a SRT panel held in place across the top of the window with slide-on spacer materials and springs to provides position retention for the laminate while accommodating movement resulting from thermal expansion.
Figure 40:
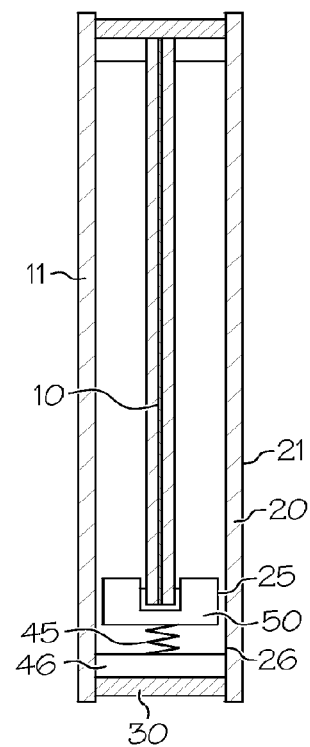
FIG. 40 is a cross-section view of the SRT panel of FIG. 39 illustrating the slide-on spacer material and loaded spring.
Figure 41:
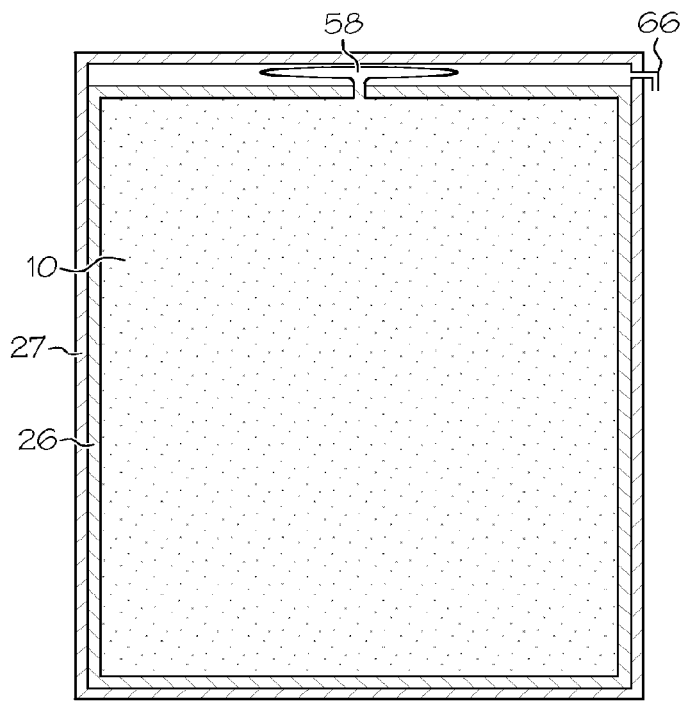
FIG. 41 is a side view of a SRT panel held in place across the top of the window with a bladder to provide position retention for the laminate while accommodating movement resulting from thermal expansion.

In another aspect, FIG. 38 shows a SRT window system 64 with a decorative edge 57 (i.e., silk-screened paint or other design) to hide the open area between the SRT pane 10 and the edge of the window. The decorative edge 57 approach may be used from the inside, outside or both. Additionally, due to the gap on the plastic SRT designs or due to the heat loss from the frame, a painted border can be used to obscure the edge effects and attachment points of the SRT pane. FIG. 39 shows a SRT panel 10 held in place across the top of the window with a slide-on U-groove spacer 50 made of slippery material and spring loading the SRT plastic allowing for movement resulting from thermal expansion. FIG. 40 shows the SRT panel of FIG. 39 illustrating the slide-on spacer material 50 and loaded spring 45. FIG. 41 shows an SRT window assembly 64 with a bladder 58 and a vent tube 66 to let the gas in the SRT layer 10, warmed by sunlight, expand and then contract as the sun sets and the SRT layer 10 cools.

In another aspect, FIG. 42 shows an SRT window assembly 64 which includes a sash 65 and may be used with the designs described previously and may be adapted to pivot 63 about either a vertical axis or a horizontal axis. The pivoting window assembly 64 may be configured as window pane 20 such that a low E coating material disposed at surface 21 in the summer could be pivoted to occupy surface 13 in the winter. FIG. 43 shows an SRT window assembly 64 having a SRT panel 10 held in place against window pane 11 using a magnetic strip 68. Magnetic strips 68 can be located at the top, bottom, sides or just at the top. The magnetic strips 68 are affixed to the plastic 10 and the glass 11 and also serve the function of spacing the SRT panel 10 at the appropriate distance between the two glass window panes 11, 20.

Figure 44:
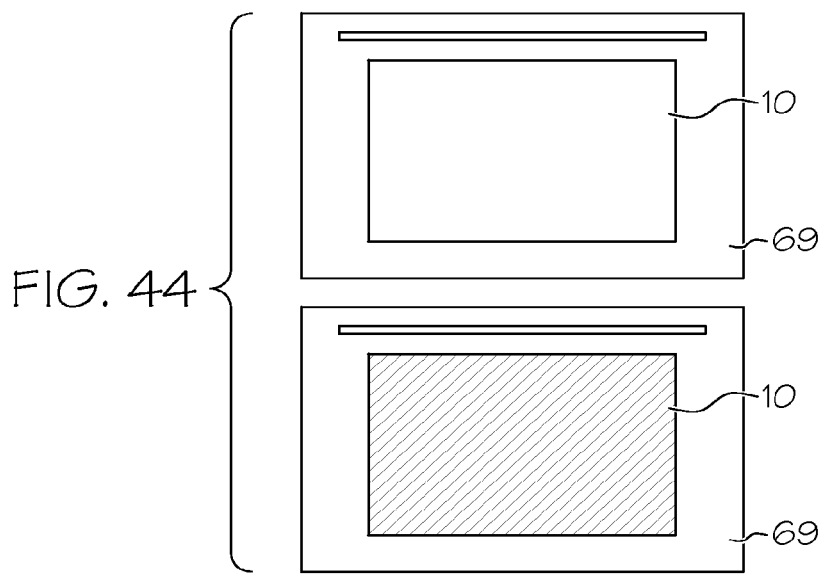
FIG. 44 is a side-view of a SRT window in an oven door application illustrating high light transmission (i.e., changing from mostly clear to a colored state such as red or blue) when warm and the color neutral higher light transmission (i.e., transparent in upper illustration) when cool.

FIG. 44 shows a SRT panel 10 in an oven door window application 69. In this embodiment, the SRT panel changes from high light transmission (i.e., changing from mostly clear to a colored state such as red or blue) when warm and the more color neutral higher light transmission (i.e., transparent in upper illustration) when cool. The red, blue or other thermochromic transparent color still allows the window to have a high amount of light transmission for a continuous view inside. The SRT layer 10 may be positioned to allow the heat from the oven to warm the door yet not hot enough to cause damage to the SRT layer 10. In another aspect, the oven can be equipped with an electrically conductive layer to heat the SRT layer 10 or alternatively a valve design to allow heat to circulate from the oven to the SRT layer 10 to achieve the red color temperature of 60-80° C. as a preferred temperature range.

Figure 45:
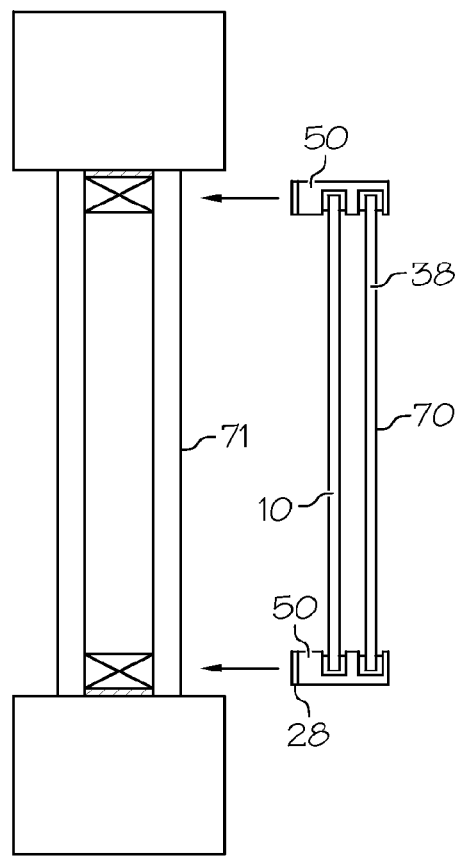
FIG. 45 is a cross-section view of a SRT window insert adapted for placement into an existing window frame.

In another aspect, FIG. 45 shows a SRT window insert system 70 designed to be retrofitted into an existing window structure 71. In one embodiment, the SRT insert 70 is made of a plastic SRT panel pane 10 and of a low E pane 38 having a low E coating facing the existing window structure. The insert 70 can be affixed to the existing window structure 71 by an adhesive 28 or by magnetic strips 68.

The existing window structure 71 includes a window frame which may withdraw heat from the perimeter of the SRT device 70 resulting in a cooler perimeter on the SRT panel 10. This results in a lighter color perimeter (i.e., a halo effect). This can be prevented by insulating the window frame from the SRT device to prevents the frame or building from withdrawing heat from the perimeter of the SRT device. In one embodiment, the panel 70 can be insulated from the frame by spacing it from the frame, for example by using a spacer 50 containing a groove in which the panel 70 is inserted. In another embodiment, the panel 70 may include an insulating gasket around all or a portion of its perimeter. In yet another embodiment, the SRT layer 10 may be inset (i.e., recessed) from the edge of a larger substrate 15 (i.e., glass or plastic), wherein the inset dimension may be, for example, about 3 mm to 20 mm. Insetting allows heat transfer from the edge of the SRT laminate 10 to be reduced.

Figure 46:
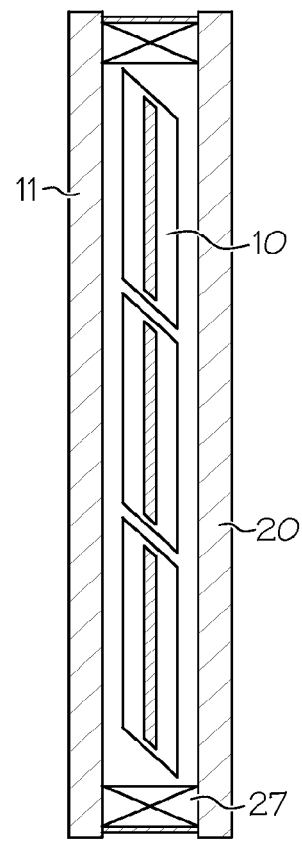
FIG. 46 is a cross-section view of a SRT window system adapted with SRT plastic slats.

In another aspect, FIG. 46 shows a SRT window system in which slats incorporating SRT material 10 are provided. This design is advantageous because the slats are able to expand as the panel heats. The SRT slats can be suspended similarly to Venetian blinds.

Figure 47:
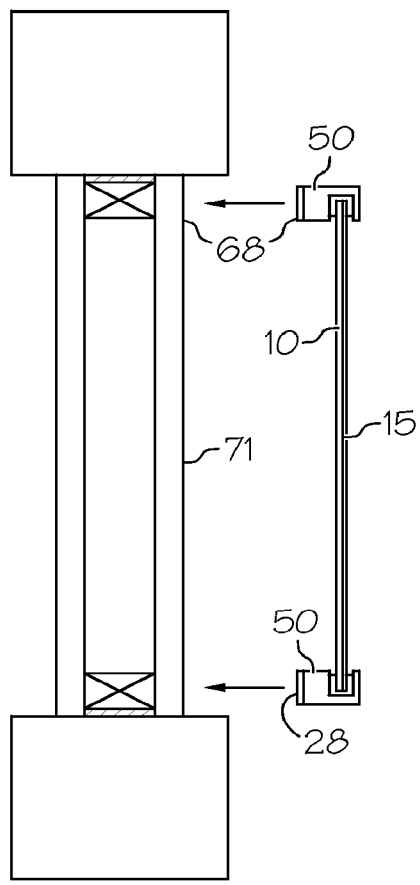
FIG. 47 is a cross-sectional view of a SRT window system having a single pane SRT panel attached to an existing window structure by an adhesive or by magnetic strips.
Figure 48:
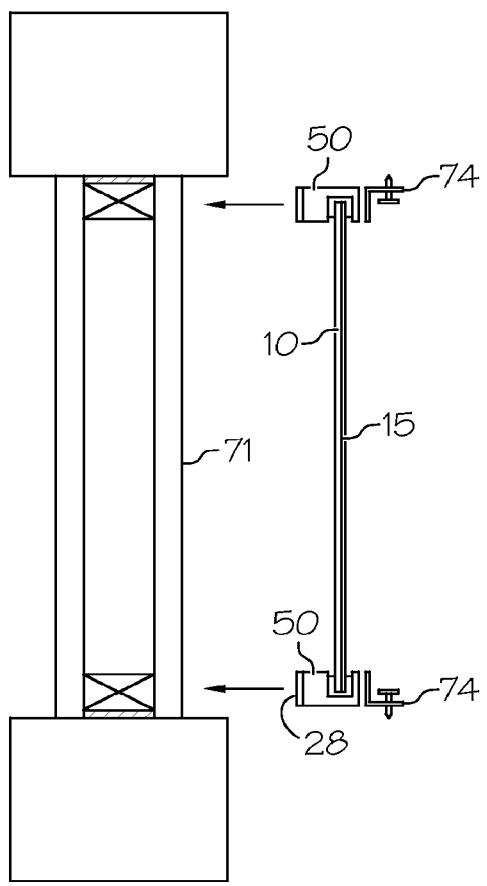
FIG. 48 is a cross-sectional view of the SRT window system of FIG. 47 adapted with a bracket and screw to attach the SRT panel to an existing window.

FIGS. 47 and 48 are modifications to FIG. 45 which illustrate how a SRT glass or plastic laminate 10 can be attached to an existing window structure 71. FIG. 47 shows a single pane of SRT panel 10 made of glass or plastic that can be attached to an existing window structure 71 by a variety of means, such as but not limited to, an adhesive 28, magnetic strips 68, etc.

The attached SRT panel 10 may be combined with a fixed spacer 50 of about 1.5 mm to about 48 mm in depth to separate (i.e., insulate) the SRT panel 10 from the existing window 71. The SRT panel 10 may further include a low E coating on surface 15 to reflect the absorbed heat and to act as a low emissive surface to keep heat from radiating to the interior. FIG. 48 shows a mechanical assembly 74 (i.e., bracket and screw) for attaching the SRT panel 10 in place.

Figure 49A:
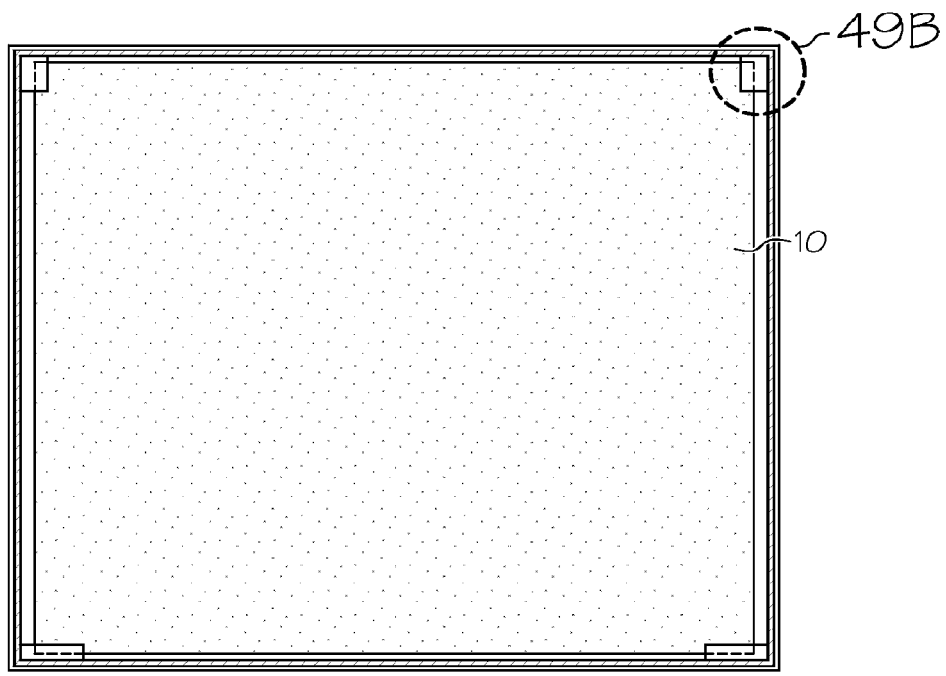
FIG. 49 is a front view of a SRT window system having a U-groove spacer adapted within an existing IG structure to minimize heat transfer from the SRT laminate to the outer window edge.
Figure 49B:
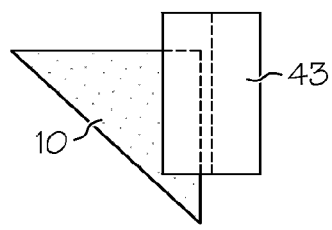

FIG. 49 illustrates an SRT panel 10 combined with a U-groove spacer 43 (see FIG. 49A and partial expanded view FIG. 49B) adapted within an existing IG structure. Typically, the IG structure has an air space of about 6 mm to about 9 mm. By using the U-groove spacer 43 as a holder for the SRT panel 10, the existing construction can be modified with minimal cost and assembly time. An additional benefit is the isolation of the SRT panel 10 from the edge of the traditional spacer, which thermally insulates the SRT panel 10 except at four small points along the perimeter edge. The U-groove spacer 43 will accommodate the thermal expansion of the SRT panel 10 as it absorbs sunlight and maintains spacing between the outer glass pane and SRT panel 10.

Figure 50:
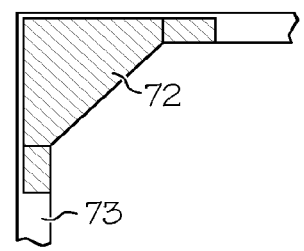
FIG. 50 is front view of a plastic corner key which secures the SRT panel and provides mechanical attachment of traditional aluminum box spacers to reduce heat transfer from the SRT laminate to the outer window edge.

FIG. 50 illustrates a plastic corner key 72 that serves as the holder of the SRT panel and the mechanical attachment of traditional aluminum box spacers 73. The SRT panel is free to float in the plastic corner piece 72. The corner key 72 dimensions may be adapted to fit the desired spacing dimensions between the outside and inside panes. The corner key 72 can be made of any plastic, but preferably a plastic that allows the SRT panel to expand.

One type of thermochromic material useful herein is termed ligand exchange thermochromic, LETC, systems. LETC systems have thermochromic activity which results in a reversible change in absorbance of electromagnetic radiation as the temperature of the system is reversibly changed. That the change is reversible means that the amount of change in absorbance remains consistent, for both the increase and decrease in absorbance throughout a given temperature range, on repeated temperature cycling, for some useful number of cycles. The LETC thermochromics have a net increase in their ability to absorb visible and/or NIR light energy as the temperature of the system increases and a net decrease in their ability to absorb visible and/or NIR light energy as the temperature of the system decreases for temperatures within the active range of the system. The active temperature range of the system is determined by the thermodynamic properties of the LETC reactions. For many preferred applications, like sunlight responsive thermochromic windows, the active temperature range includes 0 to 100° C.

LETC systems comprise one or more than one transition metal ions such as $Cu^{++}$, $Ni^{++}$, or $Co^{++}$ ions, which experience thermally induced changes in the nature of the complexation or coordination around the transition metal ion(s) and thereby the system changes its ability to absorb electromagnetic radiation as the temperature changes. As explained in the copending application LETC systems employ so-called high $\epsilon$ ligands (H$\epsilon$L's) and low $\epsilon$ ligands (L$\epsilon$L's). Upon increasing in temperature, one or more of the L$\epsilon$L's will be displaced by one or more H$\epsilon$L's to give a complex that absorbs more visible and/or NIR radiation. Examples of L$\epsilon$L's are diols, triols, certain hydroxy containing polymers like polyvinylbutyral and certain nitrogen-containing heterocyclics such as ethylbenzimidazole.

Seals are of interest especially for LETC layers which are sensitive to oxygen, water and/or environmental contaminants For example, systems involving iodide, systems involving phosphine compounds and systems involving both iodide and phosphine compounds benefit from seals that minimize the ingress of oxygen in the layers containing these systems. An edge seal may be provided when the LETC layer is laminated between sheets of glass or sheets of plastic. The edge seal must cover the edge of the laminate around the entire perimeter to provide a barrier for ingress of materials into the LETC layer. The edge seal may be a thermoplastic, a thermoset, a rubber, a metallized tape or combinations thereof. Useful thermoset seal materials are urethanes and epoxies. Suitable seals are epoxy systems disclosed for use as perimeter seals in U.S. Pat. No. 6,665,107. Useful thermoplastic seal materials are good barrier polymers like poly(vinyl alcohol), poly(vinylidene chloride), (polyvinylidene fluoride), EVOH, and certain rubbers. Thermoplastic or thermoset systems overlayed with an impermeable metal foil or tape are useful edge seal systems especially when the LETC systems contain ligands like iodide or phosphine compounds they are or are not used as ligands.

For the use of LETC systems in applications like energy saving windows, especially, SRT™ Windows, there is a demand for certain colors. While fixed tint windows which are gray, green, blue and bronze are in widespread use, the most desirable color, (or lack thereof), for variable tint windows is gray. This is especially true when the window is or is able to become heavily tinted as the view through a heavily tinted gray window maintains the same color rendition for objects viewed through the window as is maintained with a lightly tinted or nearly colorless window. Also it is highly desirable for the daylighting that comes in through the window to be color neutral so that people and objects illuminated by that light have a normal appearance. We have discovered interesting systems with a green, blue or bronze appearance when lightly tinted which change to gray when heavily tinted. These systems and those that are close to gray at all tint levels are useful.

LETC systems with absorbance peaks throughout the visible and/or NIR are disclosed herein. However, just a few special, single composition systems that are reasonably gray have been found. A few more combinations of two compositions or layers of LETC materials have been discovered that provide good gray appearance throughout the entire temperature range of intended use. Many more combinations involving three compositions or layers have been discovered that provide good gray appearance. Gray systems are illustrated in the Examples Section of this disclosure.

Useful LETC systems are those that not only maintain a consistent gray appearance throughout a large temperature range; they also have a large change in visible light and/or total solar absorption, for example single LETC systems, desirably have a c* of less than 25 throughout the temperature range of 25° C. to 85° C. and still have a change in Y from greater than 70 at 25° C. to less than 15 at 85° C.

It is preferred that the electromagnetic radiation, for which absorbance changes occur, be in the ultraviolet and especially the visible and/or NIR portions of the electromagnetic spectrum. The change in light absorption on heating of the LETC systems generally results in a change from one color to another color and/or a darkening of the color of the system. However, if the increase in light absorption is predominantly in NIR, the LETC system may still be very useful even though little or no visual color change occurs. For the most preferred applications of the LETC systems or layers disclosed herein, there is a net increase in the ability of the system to absorb incident visible and/or NIR sunlight power (or energy over time), as the temperature of the systems increase. In most cases, this means that the LETC systems become darker in color as the temperature of the systems increase.

The inventions disclosed here are particularly useful when used in combination with the window constructions disclosed in U.S. Pat. Nos. 6,084,702 and 6,446,402, and the LETC systems disclosed in the co-pending U.S. patent application Ser. No. 11/849,574, the contents of which are hereby incorporated by reference.

Having described the invention in detail and by reference to specific embodiments thereof, it will be apparent that numerous variations and modifications are possible without departing from the spirit and scope of the following claims.

What is claimed is:

1. A window comprising at least one pane of glass or plastic, and a sunlight responsive thermochromic (SRT) device including a layer of a thermochromic material that reversibly increases in its absorption of visible and/or NIR radiation when the temperature of the thermochromic material increases and decreases in its absorption of visible and/or NIR radiation when the temperature of the thermochromic material decreases for temperatures within the active range of the system, a pair of transparent substrates, the layer of the thermochromic material being interposed between the substrates to form a laminate; and
    a space between the at least one pane of glass or plastic and the SRT device.

2. The window of claim 1 where the window pane(s) is/are glass.

3. The window of claim 1 where window pane(s) is/are plastic.

4. The window of claim 1 where there are two panes and there is a space between the SRT device and each pane, and one or both spaces is evacuated, contains an insulating gas, or a highly conductive gas.

5. The window of claim 4 where the thermochromic material includes one or more transition metals that reversibly form metal ligand complexes with one or more HϵL's and LϵL's.

6. The window of claim 5 where the window is constructed such that when it is associated with a building having an outside and an inside contains an insulating gas.

7. The window of claim 5 where the window is constructed such that when it is associated with a building having an outside and an inside and the space closest to the outside contains a highly conductive gas the space closest to the inside is evacuated.

8. The window of claim 6 where the window is constructed such that when it is associated with a building having an outside and an inside one or both spaces contains a tube to relieve gas pressure.

9. The window of claim 1 wherein the window includes a frame and the SRT device is insulated from the frame to prevent the frame from withdrawing heat from the perimeter of the SRT device.

10. The window of claim 9 wherein the SRT device is insulated from the frame by spacing the SRT device from the frame or by inserting an insulative material between the perimeter of the SRT device and the frame.

11. The window of claim 6 where the window pane closest to the inside has a low E coating.

12. The window of claim 6 where the window pane closest to the outside has a low E coating.

13. The window of claim 6 where the window panes are separated by a spacer material with integral material to provide for expansion of the SRT window pane.

14. The window of claim 13 where the window panes are separated by a thermally broken aluminum spacer.

15. The window of claim 6 including a plastic film in a spaced planar parallel relationship with one of the panes that divides the space into an additional space.

16. The window of claim 15 where the plastic is coated with one or more low E coatings.

17. The window of claim 1 further including a louver in one or both spaces for controlling the entry and or exit of a gas into and out of the space.

18. The window of claim 17 where the louver is composed of two metal layers having different rates of expansion bonded together wherein when a predetermined temperature is reached the louver warps and opens the space.

19. The window of claim 1 wherein the SRT device is in the form of a plurality of rotatable slats that can be rotated to adjust the angle with which sunlight strikes the slats and/or to allow a portion of the sunlight to pass through the window without interacting with the SRT device.

20. The window of claim 19 wherein a plurality of rotatable slats are located in at least one space to adjust the amount of light passing through the SRT device and/or passing through the window.

21. The window of claim 1 comprising a plastic film interposed between the at least one pane and the SRT device.

22. The window of claim 21 wherein the plastic film is a heat mirror plastic film with low-e properties on at least one side of the film.

23. The window of claim 21 wherein the window is constructed such that when it is associated with a structure having an outside and an inside, the SRT device is closer to the outside relative to the heat mirror plastic film.

24. The window of claim 23 wherein the at least one pane is a glass pane adjacent the inside of the structure.

25. A structure comprising:
a sunlight responsive thermochromic (SRT) device comprising a layer of a thermochromic material that reversibly increases in its absorption of visible and/or NIR radiation when the temperature of the thermochromic material increases and decreases in its absorption of visible and/or NIR radiation when the temperature of the thermochromic material decreases for temperatures within the active range of the system, and a pair of transparent substrates, the layer of the thermochromic material being interposed between the substrates to form a laminate;
a pane of glass or plastic; and
a heat mirror plastic film, wherein the heat mirror plastic film is positioned between the SRT device and the pane.

26. The structure of claim 25 wherein the heat mirror plastic film has low-E properties on at least one side of the film.

* * * * *

UNITED STATES PATENT AND TRADEMARK OFFICE
CERTIFICATE OF CORRECTION

| | | |
|---|---|---|
| PATENT NO. | : 8,154,788 B2 | Page 1 of 1 |
| APPLICATION NO. | : 12/906704 | |
| DATED | : April 10, 2012 | |
| INVENTOR(S) | : Frederick A. Millett et al. | |

It is certified that error appears in the above-identified patent and that said Letters Patent is hereby corrected as shown below:

Column 14, Line 56, reads, "high $\epsilon$ ligands (H$\epsilon$L's) and low $\epsilon$ ligands (L$\epsilon$L's)" it should read -- high $\varepsilon$ ligands (H$\varepsilon$L's) and low $\varepsilon$ ligands (L$\varepsilon$L's) --

Column 14, Line 57, reads "of the L$\epsilon$L's" it should read -- of the L$\varepsilon$L's --

Column 14, Line 58, reads "one or more H$\epsilon$L's to" it should read -- one or more H$\varepsilon$L's to --

Column 14, Line 60, reads "Examples of L$\epsilon$L's are" it should read -- Examples of L$\varepsilon$L's are --

Column 16, Claim 5, Line 37 reads "more H$\epsilon$L's and" it should read -- more H$\varepsilon$L's and --

Column 16, Claim 5, Line 38, reads "L$\epsilon$L's." it should read -- L$\varepsilon$L's. --

Signed and Sealed this

Seventeenth Day of July, 2012

David J. Kappos
*Director of the United States Patent and Trademark Office*